US008563071B2

(12) United States Patent
Schweizer et al.

(10) Patent No.: US 8,563,071 B2
(45) Date of Patent: *Oct. 22, 2013

(54) PRODUCTION OF SOLUBLE PROTEIN SOLUTIONS FROM SOY ("S701" CIP)

(75) Inventors: Martin Schweizer, Winnipeg (DE); Kevin I. Segall, Winnipeg (CA); Brent E. Green, Warren (CA); Sarah Medina, Winnipeg (CA); James Logie, Winnipeg (CA); Brandy Gosnell, Winnipeg (CA)

(73) Assignee: Burcon Nutrascience (MB) Corp., Winnipeg, Manitoba (CA)

( * ) Notice: Subject to any disclaimer, the term of this patent is extended or adjusted under 35 U.S.C. 154(b) by 104 days.

This patent is subject to a terminal disclaimer.

(21) Appl. No.: 12/923,897

(22) Filed: Oct. 13, 2010

(65) Prior Publication Data

US 2011/0038993 A1    Feb. 17, 2011

Related U.S. Application Data

(63) Continuation-in-part of application No. 12/603,087, filed on Oct. 21, 2009.

(60) Provisional application No. 61/107,112, filed on Oct. 21, 2008, provisional application No. 61/193,457, filed on Dec. 2, 2008, provisional application No. 61/202,070, filed on Jan. 26, 2009, provisional application No. 61/202,553, filed on Mar. 12, 2009, provisional application No. 61/213,717, filed on Jul. 7, 2009, provisional application No. 61/272,241, filed on Sep. 3, 2009.

(51) Int. Cl.
*A23L 1/20* (2006.01)

(52) U.S. Cl.
USPC ............................ 426/634; 426/656; 426/598

(58) Field of Classification Search
USPC ....................................................... 426/634
See application file for complete search history.

(56) References Cited

U.S. PATENT DOCUMENTS

| | | | |
|---|---|---|---|
| 3,736,147 A | 5/1973 | Iacobucci et al. | |
| 4,088,795 A | 5/1978 | Goodnight et al. | |
| 4,131,607 A | 12/1978 | Petit et al. | |
| 4,208,323 A | 6/1980 | Murray et al. | |
| 4,296,026 A * | 10/1981 | Millar | 530/378 |
| 4,307,118 A | 12/1981 | Kajs | |
| 4,697,004 A | 9/1987 | Puski et al. | |
| 4,889,921 A | 12/1989 | Diosady et al. | |
| 5,086,166 A | 2/1992 | Lawhon et al. | |
| 5,658,714 A | 8/1997 | Westfall et al. | |
| 5,844,086 A | 12/1998 | Murray | |
| 6,005,076 A | 12/1999 | Murray | |
| 6,630,195 B1 | 10/2003 | Muralidhara et al. | |
| 6,720,020 B2 | 4/2004 | Karleskind et al. | |
| 6,841,184 B2 | 1/2005 | Porter et al. | |
| 7,306,821 B2 | 12/2007 | Singh | |
| 7,309,773 B2 | 12/2007 | Green | |
| 7,429,399 B2 | 9/2008 | Porter | |
| 2001/0018197 A1 | 8/2001 | Wong et al. | |
| 2003/0211225 A1 | 11/2003 | Singh | |
| 2004/0086624 A1 | 5/2004 | Saito et al. | |
| 2005/0123649 A1 * | 6/2005 | Benitez et al. | 426/72 |
| 2005/0255226 A1 | 11/2005 | Schweizer | |
| 2007/0014909 A1 | 1/2007 | Mai et al. | |
| 2007/0092625 A1 * | 4/2007 | Ishimoto et al. | 426/598 |
| 2007/0237877 A1 | 10/2007 | Diosady et al. | |
| 2010/0010198 A1 | 1/2010 | Schweizer | |
| 2010/0036099 A1 | 2/2010 | Schweizer | |
| 2010/0040763 A1 | 2/2010 | Segall | |
| 2010/0048875 A1 | 2/2010 | Segall | |

FOREIGN PATENT DOCUMENTS

| | | |
|---|---|---|
| CA | 2564400 | 11/2005 |
| JP | 62-143653 | 6/1987 |
| JP | 07-236427 | 9/1995 |
| JP | 09-037720 | 2/1997 |
| JP | 11-346668 | 12/1999 |
| JP | 2000-083595 | 3/2000 |
| JP | 2009-149697 | 7/2009 |
| JP | 2009-183301 | 8/2009 |
| WO | WO 95/27406 | 10/1995 |
| WO | PCT/JP2002/001678 | 9/2002 |
| WO | WO 2006/047308 | 5/2006 |
| WO | PCT/JP2008/057858 | 11/2008 |

OTHER PUBLICATIONS

Friedman, Mendel, "Nutritional and Health Benefits of Soy Protein" in Journal of Agricultural and Food Chemistry, Mar. 2011, vol. 49, No. 3, p. 1070-1086.*
Honig, D.H. et al. 1987. J. Agri. Food. Chem., 25; p. 967-971.
Kakade, M.L. et al. 1974. Cereal Chem., 51; p. 376-381.
Latta and Eskin. 1980. J. Agri. Food Chem., 28; p. 1313-1315.
Morr, C.V. et al. 1985. J. of Food Science, 50; p. 1715-1718.
Omosaiye, O., and Cheryan, M. 1979. J. Food Sci., 44; p. 1027-1031.
Segall, K. 2009. Food Engineering and Ingredients; Apr./May 2009; vol. 34, Issue 2, p. 10-12.

* cited by examiner

*Primary Examiner* — Elizabeth Gwartney
(74) *Attorney, Agent, or Firm* — Michael I. Stewart; Sim & McBurney

(57) ABSTRACT

A soy protein product, which may be an isolate, produces transparent heat-stable solutions at low pH values and is useful for the fortification of soft drinks and sports drinks without precipitation of protein. The soy protein product is obtained by extracting a soy protein source material with an aqueous calcium salt solution to form an aqueous soy protein solution, separating the aqueous soy protein solution from residual soy protein source, adjusting the pH of the aqueous soy protein solution to a pH of about 1.5 to about 4.4 to produce an acidified clear soy protein solution, which may be dried, following optional concentration and diafiltration, to provide the soy protein product.

61 Claims, No Drawings

PRODUCTION OF SOLUBLE PROTEIN SOLUTIONS FROM SOY ("S701" CIP)

REFERENCE TO RELATED APPLICATIONS

This application is a continuation-in-part of copending U.S. patent application Ser. No. 12/603,087 filed Oct. 21, 2009 (US Patent Publication No. 2010-0098818; WO2010/045727), which itself claims priority under 35 USC 119(e) from U.S. Patent Applications Nos.: 61/107,112 filed Oct. 21, 2008; 61/193,457 filed Dec. 2, 2008; 61/202,070 filed Jan. 26, 2009; 61/202,553 filed Mar. 12, 2009; 61/213,717 filed Jul. 7, 2009 and 61/272,241 filed Sep. 3, 2009.

FIELD OF INVENTION

The present invention is directed to the production of protein solutions from soy and to novel soy protein products.

BACKGROUND TO THE INVENTION

A protein product, particularly an isolate, that is highly soluble and produces transparent solutions at low pH would be greatly valued in the food industry for use in various products, particularly beverages, such as soft drinks and sports drinks. The above properties combined with heat stability would further increase the value of the product. Proteins for food use may be derived from plant or animal sources but plant proteins are often less expensive. Soy is a very common source of plant proteins for food use. Soy proteins are recognized for their excellent nutritional properties and health benefits.

Soy protein isolates conventionally are formed by an isoelectric precipitation procedure in which meal from the separation of soy oil from soybeans is processed by an initial extraction under alkaline conditions, before the alkaline extract is acidified to the isoelectric point of soybean protein to result in protein precipitation. The precipitated soy protein may be washed and/or neutralized, then is dried to provide the soy protein isolate. Soy protein isolates have a protein content of at least about 90 wt % (N×6.25) on a dry weight basis (d.b.).

Although a range of soy protein products is available, with a variety of functional properties, to our knowledge, there does not exist a soluble soy protein isolate or product that produces transparent and heat stable solutions under low pH conditions.

SUMMARY OF INVENTION

It has now been found that it is possible to provide a soy protein product having a protein content of at least about 60 wt % (N×6.25) d.b. that produces transparent and heat stable solutions at low pH values and, therefore, which may be used for protein fortification of, in particular, soft drinks and sports drinks, as well as other aqueous systems, without precipitation of protein.

The novel soy protein product provided herein has a unique combination of parameters not found in other soy protein products. The product is completely soluble in aqueous solution at acid pH values less than about 4.4 and is heat stable in this pH range permitting thermal processing of the aqueous solution of the product, such as hot fill applications. Given the complete solubility of the product, no stabilizers or other additives are necessary to maintain the protein in solution or suspension. The soy protein product has been described as having no "beany" flavour and no off odours. The product is low in phytic acid, generally less than about 1.5 wt %, preferably less than about 0.5 wt %. No enzymes are required in the production of the soy protein product. The soy protein product is preferably an isolate having a protein content of at least about 90 wt %, preferably at least about 100 wt % (N×6.25).

In accordance with one aspect of the present invention, there is provided a method of producing a soy protein product having a soy protein content of at least about 60 wt % (N×6.25) on a dry weight basis, which comprises:

(a) extracting a soy protein source with an aqueous calcium chloride solution to cause solubilization of soy protein from the protein source and to form an aqueous soy protein solution, (b) at least partially separating the aqueous soy protein solution from residual soy protein source, (c) optionally diluting the aqueous soy protein solution, (d) adjusting the pH of the aqueous soy protein solution to a pH of about 1.5 to about 4.4, preferably about 2 to about 4, to produce an acidified clear soy protein solution, (e) optionally polishing the acidified clear soy protein solution to remove residual particulates, (f) optionally concentrating the aqueous clear soy protein solution while maintaining the ionic strength substantially constant by using a selective membrane technique, (g) optionally diafiltering the concentrated soy protein solution, and (h) optionally drying the concentrated soy protein solution.

The soy protein product preferably is an isolate having a protein content of at least about 90 wt %, preferably at least about 100 wt %, (N×6.25) d.b.

The present invention further provides a novel soy protein isolate which is water soluble and forms heat stable transparent solutions at acid pH values of less than about 4.4 and is useful for the protein fortification of aqueous systems, including soft drinks and sports drinks, without leading to protein precipitation. The soy protein isolate is also low in phytic acid content, generally less than about 1.5% by weight, preferably less than about 0.5% by weight. The soy protein in the product is not hydrolyzed.

Thus, in another aspect to the present invention, there is provided a soy protein isolate having a protein content of at least about 90 wt % (N×6.25) d.b., preferably at least about 100 wt % (N×6.25) d.b., which is substantially completely soluble in an aqueous medium at a pH of less than about 4.4, preferably about 1.5 to about 4.4.

The soy protein isolate provided herein may be provided as an aqueous solution thereof having a high degree of clarity at acid pH values, generally from less than about 4.4, preferably about 1.5 to about 4.4, and which is heat stable at these pH values.

The novel soy protein product of the invention can be blended with powdered drinks for the formation of aqueous soft drinks or sports drinks by dissolving the same in water. Such blend may be a powdered beverage.

While the present invention refers mainly to the production of soy protein isolate, it is contemplated that soy protein products of lesser purity may be provided having similar properties to the soy protein isolate. Such lesser purity products may have a protein concentration of at least about 60% by weight (N×6.25) d.b.

In another aspect of the present invention, there is provided an aqueous solution of the soy product provided herein which is heat stable at a pH of less than about 4.4. The aqueous solution may be a beverage, which may be a clear beverage in which the soy protein product is completely soluble and transparent or an opaque beverage in which the soy protein product does not increase the opacity.

The present invention also provides a soy protein product having a protein content of at least about 60 wt % (N×6.25) d.b., preferably at least about 90 wt % and more preferably at least about 100 wt %, which is substantially completely soluble at a pH of about 7 to about 8. An aqueous solution of the soy protein product prepared at a near neutral pH, such as a pH of about 6 to about 8, may be a beverage. The aqueous solution of the soy protein product prepared at near neutral pH may also be utilized in the production of any food application that makes use of a protein product soluble at near neutral pH, such as a plant based dairy analogue, such as soy milk and soy ice cream, or a dairy-type product containing a mix of dairy and plant ingredients. The aqueous solutions are heat stable and solutions at a pH of about 7.5 to about 8 are completely transparent.

In a further aspect of the present invention, there is provided a soy protein product having a protein content of at least about 60 wt % (N×6.25) d.b., preferably at least about 90 wt %, more preferably at least about 100 wt %, which has a solubility at 1% protein w/v in water at a pH of about 2 to about 4 greater than about 95%, as determined by the methods described in Example 14 below.

Additionally, the present invention provides a soy protein product having a protein content of at least about 60 wt % (N×6.25) d.b., preferably at least about 90 wt %, more preferably at least about 100 wt %, which has an absorbance of visible light at 600 nm (A600) for a 1% protein w/v aqueous solution at a pH of about 2 to about 4 of less than 0.150, preferably less than about 0.100, more preferably less than 0.050, as determined by the method described in Example 15 below.

In accordance with a further embodiment of the invention, there is provided a soy protein product having a protein content of at least about 60 wt % (N×6.25) d.b., preferably at least about 90 wt %, more preferably at least about 100 wt %, which has a haze reading for a 1% protein w/v aqueous solution at a pH of about 2 to about 4, of less than about 15%, preferably less than about 10% and more preferably less than about 5%, as determined by the method described in Example 15 below.

In accordance with a yet further embodiment of the invention, there is provided a soy protein product having a protein content of at least about 60 wt % (N×6.25) d.b., preferably at least about 90 wt %, more preferably at least about 100 wt %, which has a haze reading for a solution thereof in water, prepared by dissolving 2 g of protein per 100 ml of water used, after heat treatment at 95° C. for 30 seconds of less than 15%, preferably less than about 10% and more preferably less than 5%, as determined by the method described in Example 16 below.

As may be seen from the data presented below, the aqueous solutions of the soy protein product provided herein are practically colourless, unlike aqueous solutions provided from typical commercial soy protein products. It will be appreciated that a completely clear, colourless solution would provide colorimeter readings of $L^*=100$, $a^*=0$ and $b^*=0$. Based on the data generated herein, in accordance with another aspect of the present invention, there is provided a novel protein product having a protein content of at least 60 wt % (N×6.25) d.b., preferably at least about 90 wt %, more preferably at least about 100 wt %, which has colorimeter readings for a solution thereof in water, prepared by dissolving sufficient soy protein product to supply 3.2 g of protein per 100 ml of water used, which are a combination of $L^*$=about 82 to about 100, preferably about 94 to about 100, $a^*$=about −2 to about 5, preferably about −1 to about 1, and $b^*$=about 0 to about 30, preferably about 0 to about 10.

The soy protein product produced according to the process herein lacks the characteristic beany flavour of soy protein products and is suitable, not only for protein fortification of acid media, but may be used in a wide variety of conventional applications of protein products, including but not limited to protein fortification of processed foods and beverages, emulsification of oils, as a body former in baked goods and foaming agent in products which entrap gases. In addition, the soy protein product may be formed into protein fibers, useful in meat analogs and may be used as an egg white substitute or extender in food products where egg white is used as a binder. The soy protein product may also be used in nutritional supplements. Other uses of the soy protein product are in pet foods, animal feed and in industrial and cosmetic applications and in personal care products.

GENERAL DESCRIPTION OF INVENTION

The initial step of the process of providing the soy protein product involves solubilizing soy protein from a soy protein source. The soy protein source may be soybeans or any soy product or by-product derived from the processing of soybeans, including but not limited to soy meal, soy flakes, soy grits and soy flour. The soy protein source may be used in the full fat form, partially defatted form or fully defatted form. Where the soy protein source contains an appreciable amount of fat, an oil-removal step generally is required during the process. The soy protein recovered from the soy protein source may be the protein naturally occurring in soybean or the proteinaceous material may be a protein modified by genetic manipulation but possessing characteristic hydrophobic and polar properties of the natural protein.

Protein solubilization from the soy protein source material is effected most conveniently using calcium chloride solution, although solutions of other calcium salts, may be used. In addition, other alkaline earth metal compounds may be used, such as magnesium salts. Further, extraction of the soy protein from the soy protein source may be effected using calcium salt solution in combination with another salt solution, such as sodium chloride. Additionally, extraction of the soy protein from the soy protein source may be effected using water or other salt solution, such as sodium chloride, with calcium salt subsequently being added to the aqueous soy protein solution produced in the extraction step. Precipitate formed upon addition of the calcium salt is removed prior to subsequent processing.

As the concentration of the calcium salt solution increases, the degree of solubilization of protein from the soy protein source initially increases until a maximum value is achieved. Any subsequent increase in salt concentration does not increase the total protein solubilized. The concentration of calcium salt solution which causes maximum protein solubilization varies depending on the salt concerned. It is usually preferred to utilize a concentration value less than about 1.0 M, and more preferably a value of about 0.10 to about 0.15 M.

In a batch process, the salt solubilization of the protein is effected at a temperature of from about 1° C. to about 100° C., preferably about 15° to about 60° C., more preferably about 15° C. to about 35° C., preferably accompanied by agitation to decrease the solubilization time, which is usually about 1 to about 60 minutes. It is preferred to effect the solubilization to extract substantially as much protein from the soy protein source as is practicable, so as to provide an overall high product yield.

In a continuous process, the extraction of the soy protein from the soy protein source is carried out in any manner consistent with effecting a continuous extraction of soy protein from the soy protein source. In one embodiment, the soy protein source is continuously mixed with the calcium salt solution and the mixture is conveyed through a pipe or conduit having a length and at a flow rate for a residence time sufficient to effect the desired extraction in accordance with the parameters described herein. In such a continuous procedure, the salt solubilization step is effected rapidly, in a time of up to about 10 minutes, preferably to effect solubilization to extract substantially as much protein from the soy protein source as is practicable. The solubilization in the continuous procedure is effected at temperatures between about 1° C. and about 100° C., preferably about 15° to about 60° C., more preferably between about 15° C. and about 35° C.

The extraction is generally conducted at a pH of about 5 to about 11, preferably about 5 to about 7. The pH of the extraction system (soy protein source and calcium salt solution) may be adjusted to any desired value within the range of about 5 to about 11 for use in the extraction step by the use of any convenient food grade acid, usually hydrochloric acid or phosphoric acid, or food grade alkali, usually sodium hydroxide, as required.

The concentration of soy protein source in the calcium salt solution during the solubilization step may vary widely. Typical concentration values are about 5 to about 15% w/v.

The protein extraction step with the aqueous salt solution has the additional effect of solubilizing fats which may be present in the soy protein source, which then results in the fats being present in the aqueous phase.

The protein solution resulting from the extraction step generally has a protein concentration of about 5 to about 50 g/L, preferably about 10 to about 50 g/L.

The aqueous calcium salt solution may contain an antioxidant. The antioxidant may be any convenient antioxidant, such as sodium sulfite or ascorbic acid. The quantity of antioxidant employed may vary from about 0.01 to about 1 wt % of the solution, preferably about 0.05 wt %. The antioxidant serves to inhibit oxidation of any phenolics in the protein solution.

The aqueous phase resulting from the extraction step then may be separated from the residual soy protein source, in any convenient manner, such as by employing a decanter centrifuge or any suitable sieve, followed by disc centrifugation and/or filtration, to remove residual soy protein source material. The separated residual soy protein source may be dried for disposal. Alternatively, the separated residual soy protein source may be processed to recover some residual protein. The separated residual soy protein source may be re-extracted with fresh calcium salt solution and the protein solution yielded upon clarification combined with the initial protein solution for further processing as described below. Alternatively, the separated residual soy protein source may be processed by a conventional isoelectric precipitation procedure or any other convenient procedure to recover residual protein.

Where the soy protein source contains significant quantities of fat, as described in U.S. Pat. Nos. 5,844,086 and 6,005,076, assigned to the assignee hereof and the disclosures of which are incorporated herein by reference, then the defatting steps described therein may be effected on the separated aqueous protein solution. Alternatively, defatting of the separated aqueous protein solution may be achieved by any other convenient procedure.

The aqueous soy protein solution may be treated with an adsorbent, such as powdered activated carbon or granulated activated carbon, to remove colour and/or odour compounds. Such adsorbent treatment may be carried out under any convenient conditions, generally at the ambient temperature of the separated aqueous protein solution. For powdered activated carbon, an amount of about 0.025% to about 5% w/v, preferably about 0.05% to about 2% w/v, is employed. The adsorbing agent may be removed from the soy solution by any convenient means, such as by filtration.

The resulting aqueous soy protein solution may be diluted generally with about 0.5 to about 10 volumes, preferably about 0.5 to about 2 volumes, of aqueous diluent in order to decrease the conductivity of the aqueous soy protein solution to a value of generally below about 90 mS, preferably about 4 to about 18 mS. Such dilution is usually effected using water, although dilute salt solution, such as sodium chloride or calcium chloride, having a conductivity of up to about 3 mS, may be used.

The diluent with which the soy protein solution is mixed may have a temperature of about 2° to about 70° C., preferably about 10° to about 50° C., more preferably about 20° to about 30° C.

The diluted soy protein solution then is adjusted in pH to a value of about 1.5 to about 4.4, preferably about 2 to about 4, by the addition of any suitable food grade acid, to result in a clear acidified aqueous soy protein solution. The clear acidified aqueous soy protein solution has a conductivity of generally below about 95 mS, preferably about 4 to about 23 mS.

The clear acidified aqueous soy protein solution may be subjected to a heat treatment to inactivate heat labile antinutritional factors, such as trypsin inhibitors, present in such solution as a result of extraction from the soy protein source material during the extraction step. Such a heating step also provides the additional benefit of reducing the microbial load. Generally, the protein solution is heated to a temperature of about 70° to about 160° C., for about 10 seconds to about 60 minutes, preferably about 80° to about 120° C. for about 10 seconds to about 5 minutes, more preferably about 85° to about 95° C., for about 30 seconds to about 5 minutes. The heat treated acidified soy protein solution then may be cooled for further processing as described below, to a temperature of about 2° to about 60° C., preferably about 20° C. to about 35° C.

The optionally diluted, acidified and optionally heat treated protein solution may optionally be polished by any convenient means, such as by filtering, to remove any residual particulates.

The resulting clear acidified aqueous soy protein solution may be directly dried to produce a soy protein product. In order to provide a soy protein product having a decreased impurities content and a reduced salt content, such as a soy protein isolate, the clear acidified aqueous soy protein solution may be processed prior to drying.

The clear acidified aqueous soy protein solution may be concentrated to increase the protein concentration thereof while maintaining the ionic strength thereof substantially constant. Such concentration generally is effected to provide a concentrated soy protein solution having a protein concentration of about 50 to about 300 g/L, preferably about 100 to about 200 g/L.

The concentration step may be effected in any convenient manner consistent with batch or continuous operation, such as by employing any convenient selective membrane technique, such as ultrafiltration or diafiltration, using membranes, such as hollow-fibre membranes or spiral-wound membranes, with a suitable molecular weight cut-off, such as about 3,000 to about 1,000,000 Daltons, preferably about 5,000 to about 100,000 Daltons, having regard to differing membrane materials and configurations, and, for continuous operation, dimensioned to permit the desired degree of concentration as the aqueous protein solution passes through the membranes.

As is well known, ultrafiltration and similar selective membrane techniques permit low molecular weight species to pass therethrough while preventing higher molecular weight species from so doing. The low molecular weight species include not only the ionic species of the food grade salt but also low molecular weight materials extracted from the source material, such as carbohydrates, pigments, low molecular weight proteins and anti-nutritional factors, such as trypsin inhibitors, which are themselves low molecular weight proteins. The molecular weight cut-off of the membrane is usually chosen to ensure retention of a significant proportion of the protein in the solution, while permitting contaminants to pass through having regard to the different membrane materials and configurations.

The concentrated soy protein solution then may be subjected to a diafiltration step using water or a dilute saline solution. The diafiltration solution may be at its natural pH or at a pH equal to that of the protein solution being diafiltered or at any pH value in between. Such diafiltration may be effected using from about 2 to about 40 volumes of diafiltration solution, preferably about 5 to about 25 volumes of diafiltration solution. In the diafiltration operation, further quantities of contaminants are removed from the clear aqueous soy protein solution by passage through the membrane with the permeate. This purifies the clear aqueous protein solution and may also reduce its viscosity. The diafiltration operation may be effected until no significant further quantities of contaminants or visible colour are present in the permeate or until the retentate has been sufficiently purified so as, when dried, to provide a soy protein isolate with a protein content of at least about 90 wt % (N×6.25) d.b. Such diafiltration may be effected using the same membrane as for the concentration step. However, if desired, the diafiltration step may be effected using a separate membrane with a different molecular weight cut-off, such as a membrane having a molecular weight cut-off in the range of about 3,000 to about 1,000,000 Daltons, preferably about 5,000 to about 100,000 Daltons, having regard to different membrane materials and configuration.

Alternatively, the diafiltration step may be applied to the clear acidified aqueous protein solution prior to concentration or to the partially concentrated clear acidified aqueous protein solution. Diafiltration may also be applied at multiple points during the concentration process. When diafiltration is applied prior to concentration or to the partially concentrated solution, the resulting diafiltered solution may then be additionally concentrated. The viscosity reduction achieved by diafiltering multiple times as the protein solution is concentrated may allow a higher final, fully concentrated protein concentration to be achieved. This reduces the volume of material to be dried.

The concentration step and the diafiltration step may be effected herein in such a manner that the soy protein product subsequently recovered contains less than about 90 wt % protein (N×6.25) d.b., such as at least about 60 wt % protein (N×6.25) d.b. By partially concentrating and/or partially diafiltering the clear aqueous soy protein solution, it is possible to only partially remove contaminants. This protein solution may then be dried to provide a soy protein product with lower levels of purity. The soy protein product is still able to produce clear protein solutions under acidic conditions.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit the oxidation of any phenolics present in the concentrated soy protein solution.

The concentration step and the optional diafiltration step may be effected at any convenient temperature, generally about 2° to about 60° C., preferably about 20° to about 35° C., and for the period of time to effect the desired degree of concentration and diafiltration. The temperature and other conditions used to some degree depend upon the membrane equipment used to effect the membrane processing, the desired protein concentration of the solution and the efficiency of the removal of contaminants to the permeate.

There are two main trypsin inhibitors in soy, namely the Kunitz inhibitor, which is a heat-labile molecule with a molecular weight of approximately 21,000 Daltons, and the Bowman-Birk inhibitor, a more heat-stable molecule with a molecular weight of about 8,000 Daltons. The level of trypsin inhibitor activity in the final soy protein product can be controlled by manipulation of various process variables.

As noted above, heat treatment of the clear acidified aqueous soy protein solution may be used to inactivate heat-labile trypsin inhibitors. The partially concentrated or fully concentrated acidified soy protein solution may also be heat treated to inactivate heat labile trypsin inhibitors. When the heat treatment is applied to the partially concentrated acidified soy protein solution, the resulting heat treated solution may then be additionally concentrated.

In addition, the concentration and/or diafiltration steps may be operated in a manner favorable for removal of trypsin inhibitors in the permeate along with the other contaminants. Removal of the trypsin inhibitors is promoted by using a membrane of larger pore size, such as about 30,000 to about 1,000,000 Da, operating the membrane at elevated temperatures, such as about 30° to about 60° C., and employing greater volumes of diafiltration medium, such as about 20 to about 40 volumes.

Acidifying and membrane processing the diluted protein solution at a lower pH of about 1.5 to about 3 may reduce the trypsin inhibitor activity relative to processing the solution at higher pH of about 3 to about 4.4. When the protein solution is concentrated and diafiltered at the low end of the pH range, it may be desired to raise the pH of the retentate prior to drying. The pH of the concentrated and diafiltered protein solution may be raised to the desired value, for example pH 3, by the addition of any convenient food grade alkali such as sodium hydroxide.

Further, a reduction in trypsin inhibitor activity may be achieved by exposing soy materials to reducing agents that disrupt or rearrange the disulfide bonds of the inhibitors. Suitable reducing agents include sodium sulfite, cysteine and N-acetylcysteine.

The addition of such reducing agents may be effected at various stages of the overall process. The reducing agent may be added with the soy protein source material in the extraction step, may be added to the clarified aqueous soy protein solution following removal of residual soy protein source material, may be added to the concentrated protein solution before or after diafiltration or may be dry blended with the dried soy protein product. The addition of the reducing agent may be combined with a heat treatment step and the membrane processing steps, as described above.

If it is desired to retain active trypsin inhibitors in the concentrated protein solution, this can be achieved by eliminating or reducing the intensity of the heat treatment step, not utilizing reducing agents, operating the concentration and diafiltration steps at the higher end of the pH range, such as pH 3 to about 4.4, utilizing a concentration and diafiltration membrane with a smaller pore size, operating the membrane at lower temperatures and employing fewer volumes of diafiltration medium.

The concentrated and optionally diafiltered protein solution may be subject to a further defatting operation, if required, as described in U.S. Pat. Nos. 5,844,086 and 6,005,076. Alternatively, defatting of the concentrated and optionally diafiltered protein solution may be achieved by any other convenient procedure.

The concentrated and optionally diafiltered clear aqueous protein solution may be treated with an adsorbent, such as powdered activated carbon or granulated activated carbon, to remove colour and/or odour compounds. Such adsorbent treatment may be carried out under any convenient conditions, generally at the ambient temperature of the concentrated protein solution. For powdered activated carbon, an amount of about 0.025% to about 5% w/v, preferably about 0.05% to about 2% w/v, is employed. The adsorbent may be removed from the soy protein solution by any convenient means, such as by filtration.

The concentrated and optionally diafiltered clear aqueous soy protein solution may be dried by any convenient technique, such as spray drying or freeze drying. A pasteurization step may be effected on the soy protein solution prior to drying. Such pasteurization may be effected under any desired pasteurization conditions. Generally, the concentrated and optionally diafiltered soy protein solution is heated to a temperature of about 55° to about 70° C., preferably about 60° to about 65° C., for about 30 seconds to about 60 minutes, preferably about 10 minutes to about 15 minutes. The pasteurized concentrated soy protein solution then may be cooled for drying, preferably to a temperature of about 25° to about 40° C.

The dry soy protein product has a protein content in excess of about 60 wt % (N×6.25) d.b. Preferably, the dry soy protein product is an isolate with a high protein content, in excess of about 90 wt % protein, preferably at least about 100 wt % (N×6.25) d.b.

The soy protein product produced herein is soluble in an acidic aqueous environment, making the product ideal for incorporation into beverages, both carbonated and uncarbonated, to provide protein fortification thereto. Such beverages have a wide range of acidic pH values, ranging from about 2.5 to about 5. The soy protein product provided herein may be added to such beverages in any convenient quantity to provide protein fortification to such beverages, for example, at least about 5 g of the soy protein per serving. The added soy protein product dissolves in the beverage and does not impair the clarity of the beverage, even after thermal processing. The soy protein product may be blended with dried beverage prior to reconstitution of the beverage by dissolution in water. In some cases, modification to the normal formulation of the beverages to tolerate the composition of the invention may be necessary where components present in the beverage may adversely affect the ability of the composition of the invention to remain dissolved in the beverage.

EXAMPLES

A series of trial experiments (Examples 1 to 3) were carried out to ascertain if exposure to calcium could be used to generate a soluble soy protein that produced transparent, heat stable solutions at low pH.

Example 1

Dry soybeans (30 g) were combined with either water, 0.01 M $CaCl_2$ or 0.15 M NaCl (300 ml) in a kitchen blender and processed for 5 minutes at top speed. The samples were then centrifuged at 7,100 g for 10 minutes to separate the extract from the fat and residual solids. The samples prepared with water and calcium chloride solutions had poor separation and so were centrifuged again at 10,200 g for 10 minutes. The pH of the extracts was measured and then aliquots filtered with a 0.45 μm pore size syringe filter and the protein content determined using a Leco FP528 Nitrogen Determinator. The clarity of the filtered extracts (NaCl and $CaCl_2$ trials) was measured as the absorbance at 600 nm (A600) and then a portion of the sample was acidified to pH 3 with diluted HCl and the A600 measured again. Aliquots of the clarified extracts (all trials) were also diluted 1:10 in room temperature water and the A600 and pH measured then the samples acidified to pH 3 with diluted HCl and the A600 measured again. Another aliquot of the NaCl extract was filtered with a 25 μm pore size filter paper. The conductivity of this sample was measured and then raised to 19 mS by the addition of calcium chloride. This sample was syringe filtered (0.45 μm) and then the effect of adjustment to pH 3 on sample clarity was assessed for the undiluted sample and a sample diluted 1:10 with room temperature water.

When the three extract samples were centrifuged at 7,100 g for 10 minutes, only the sodium chloride extract sample separated well. The fat was still highly dispersed in the aqueous layer for the water and calcium chloride samples. Centrifuging again at 10,200 g for 10 minutes did not much improve the separation. Perhaps this poor separation was an effect of aqueous phase density as the sodium chloride sample had much more dissolved salt than the calcium chloride sample. The post centrifugation extracts were further clarified by syringe filtering through a 0.45 μm pore size filter. The water extract plugged the filter rapidly and the calcium chloride extract did not come out entirely clear.

Surprisingly, water was found to extract more protein than the salt solutions used (Table 1, below). Addition of calcium chloride to the sodium chloride extract, which raised the conductivity from 16.70 mS to 19.99 mS was observed to introduce precipitate and protein must have been lost along with any other species removed.

TABLE 1

Protein content of various clarified extract samples

| sample | % protein |
| --- | --- |
| 0.15 M NaCl | 1.28 |
| 0.15 M NaCl plus $CaCl_2$ | 1.03 |
| 0.01 M $CaCl_2$ | 0.74 |
| water | 1.98 |

Although not clear, the undiluted extract samples acidified in the presence of calcium were clearer than the acidified sodium chloride extract, which was very cloudy (Table 2, below).

TABLE 2

Clarity of various clarified then acidified extract samples

| sample | initial pH | final pH | final A600 |
|---|---|---|---|
| 0.15 M NaCl | 6.19 | 3.01 | >3.000 |
| 0.15 M NaCl plus CaCl$_2$ | 5.38 | 3.00 | 1.220 |
| 0.01 M CaCl$_2$ | 6.11 | 2.84 | 1.066 |

Diluting the extract samples with water prior to acidification resulted in excellent clarity for the samples exposed to calcium chloride, particularly with calcium chloride in the extraction (Table 3, below). Acidification of the diluted sodium chloride and water extracts resulted in cloudy samples. Interestingly, after dilution and before acidification, notable precipitation was observed in the sodium chloride plus calcium chloride and water samples but as mentioned, after acidification only the samples with calcium were clear.

TABLE 3

Clarity of various diluted (1:10) then acidified extract samples

| sample | initial pH | final pH | final A600 |
|---|---|---|---|
| 0.15 M NaCl | 6.31 | 2.81 | 0.789 |
| 0.15 M NaCl plus CaCl$_2$ | 5.62 | 3.00 | 0.094 |
| 0.01 M CaCl$_2$ | 6.39 | 2.76 | 0.024 |
| water | 6.86 | 3.01 | 0.679 |

Example 2

Dry soybeans (30 g) were combined with either 0.05 M CaCl$_2$, 0.10 M CaCl$_2$ or 0.15 M CaCl$_2$ (300 ml) in a kitchen blender and processed for 5 minutes at top speed. The samples were then centrifuged at 7,100 g for 10 minutes to separate the extract from the fat and residual solids. The extracts were filtered with 0.45 μm pore size syringe filters and the protein content determined by Leco analysis and the clarity of the samples measured by A600. Clarified extract samples were then either acidified directly to pH 3 with diluted HCl and the A600 measured or diluted 1:10 with room temperature water and the resulting solution adjusted to pH 3 with diluted HCl and the A600 measured.

When the various calcium chloride extraction samples were centrifuged the 0.05 M and 0.10 M CaCl$_2$ samples separated quite well but the 0.15 M CaCl$_2$ sample did not. When the centrifuged extracts were syringe filtered the 0.05 M sample was crystal clear, the 0.10 M sample was slightly hazy and the 0.15 M sample was very hazy, almost milky (Table 4, below). It is thought that fat was responsible for the cloud. Working with defatted soy meal as the starting material should eliminate the problem. However, as the 0.15 M CaCl$_2$ extract could not be clarified it was excluded from the testing.

TABLE 4

Results for clarified soybean extracts with different CaCl$_2$ concentrations

| sample | % protein | A600 |
|---|---|---|
| 0.05 M CaCl$_2$ | 0.84 | 0.017 |
| 0.10 M CaCl$_2$ | 1.42 | 0.085 |
| 0.15 M CaCl$_2$ | 2.03 | 1.900 |

Dilution of the extracts into water appeared to produce some precipitate, with the amount appearing to increase at the higher salt concentration. Directly acidifying the 0.05 M and 0.10 M CaCl$_2$ extracts gave fairly clear solutions but excellent clarity was achieved by diluting these samples with water before acidifying (Table 5, below).

TABLE 5

Clarity of acidified soybean extracts with and without dilution

| sample | initial pH | final pH | final A600 |
|---|---|---|---|
| 0.05 M CaCl$_2$ | 5.55 | 3.06 | 0.079 |
| 0.05 M CaCl$_2$ (diluted 1:10) | 5.60 | 3.02 | 0.007 |
| 0.10 M CaCl$_2$ | 5.41 | 3.07 | 0.101 |
| 0.10 M CaCl$_2$ (diluted 1:10) | 5.43 | 3.07 | 0.014 |

Example 3

Toasted soy meal (10 g) was extracted with either 0.15 M NaCl, 0.15 M CaCl$_2$ or water (100 ml) for 30 minutes at room temperature on an orbital shaker platform. The samples were then centrifuged at 10,200 g for 10 minutes to separate extract from the spent meal. The supernatant was then further clarified by filtration through 25 μm pore size filter paper and the pH and conductivity of the samples measured. Small samples were then further clarified with a 0.45 μm pore size syringe filter and then analyzed for clarity (A600) and protein content (Leco). A clarified sample of each extract was diluted into 4 parts room temperature water and the A600 measured again. Diluted and undiluted extract samples were acidified to pH 3 with diluted HCl and the clarity measured again. A sample of the sodium chloride extract was also made up to a conductivity of 19 mS with calcium chloride and the clarity of full strength and 1:5 diluted samples assessed at natural pH and pH 3.

The water and calcium chloride solutions appeared to extract more protein than the sodium chloride solution (Table 6, below). Overall extractability was quite low as the meal was toasted and so exposed to relatively severe heat treatment.

TABLE 6

Properties of various extracts of toasted soy meal

| sample | pH | cond. (mS) | % protein |
|---|---|---|---|
| water | 6.63 | 3.47 | 0.43 |
| 0.15 M NaCl | 6.47 | 16.34 | 0.33 |
| 0.15 M CaCl$_2$ | 5.70 | 22.60 | 0.44 |

All three extracts were of relatively similar clarity after filtering (Table 7, below). Dilution of the water extract and the sodium chloride extract with four parts of water did not result in any protein precipitation. However, precipitate formed when the calcium chloride extract was diluted. This precipitate dissolved completely when the pH was lowered to 3 giving a crystal clear sample. The undiluted calcium chloride extract also stayed quite clear when acidified. The water and sodium chloride extracts became highly cloudy when acidified regardless of whether the sample was diluted with water.

TABLE 7

Clarity of extracts before and after acidification

| sample | A600 natural pH | A600 pH 3 |
|---|---|---|
| water | 0.261 | 2.786 |
| water (diluted 1:5) | 0.051 | 1.493 |

TABLE 7-continued

Clarity of extracts before and after acidification

| sample | A600 natural pH | A600 pH 3 |
|---|---|---|
| 0.15 M NaCl | 0.154 | 2.733 |
| 0.15 M NaCl (diluted 1:5) | 0.033 | 1.302 |
| 0.15 M CaCl$_2$ | 0.133 | 0.100 |
| 0.15 M CaCl$_2$ (diluted 1:5) | 2.058 | 0.017 |

Adding calcium chloride to the sodium chloride extract sample to achieve a conductivity of 19 mS resulted in the development of a cloud in the sample. This calcium induced precipitate did not appear to resolubilize with the addition of acid. As such, both the solutions tested contained significant cloud (Table 8, below). The precipitate should have been removed by centrifugation or filtration prior to acidification of the samples.

TABLE 8

Clarity of NaCl extract with added CaCl$_2$ before and after acidification

| sample | A600 natural pH | A600 pH 3 |
|---|---|---|
| 0.15 M NaCl plus CaCl$_2$ | 2.536 | 0.986 |
| 0.15 M NaCl plus CaCl$_2$ (diluted 1:5) | 1.261 | 1.296 |

Example 4

This Example was conducted to determine if a transparent, acidified calcium chloride extract of soy stays clear when concentrated and desalted.

'a' g of toasted soy meal was added to 'b' ml of 0.15 M CaCl$_2$ solution at ambient temperature and agitated for 30 minutes to provide an aqueous protein solution. The residual soy meal was removed and the resulting protein solution was clarified by centrifugation and filtration to produce 'c' ml of filtered protein solution having a protein content of 'd' % by weight.

The filtered protein solution was then added to 'e' ml of water and the pH of the sample lowered to 3 with diluted HCl.

The diluted and acidified protein extract solution was reduced in volume to ml by concentration on a 'g' membrane having a molecular weight cutoff of 'h' Daltons and then an aliquot of 'i' ml of concentrated, acidified protein solution was diafiltered with 'j' ml of reverse osmosis purified water. The resulting acidified, diafiltered, concentrated protein solution had a protein content of 'k' % by weight and represented a yield of 'l' wt % of the initial filtered protein solution. The acidified, diafiltered, concentrated protein solution was dried to yield a product found to have a protein content of 'm' % (N×6.25) w.b. The product was termed S701 soy protein isolate (SPI).

The parameters 'a' to 'm' are set forth in the following Table 9:

TABLE 9

| | |
|---|---|
| a | 240 |
| b | 1,000 |
| c | 480 |
| d | 1.13 |
| e | 960 |
| f | 28 |
| g | Hydrosart |
| h | 10,000 |
| i | 26 |
| j | 260 |
| k | 11.24 |
| l | 68.27 |
| m | 93.61 |

3.125 g of S701 SPI product was produced that dissolved well in water. The colour, clarity and pH of a solution of the S701 sample provided herein and in others of the Examples were assessed by the following procedure. Sufficient S701 product to supply 0.48 g of protein was dissolved in 15 ml of reverse osmosis purified water and the solution colour and haze level determined using a HunterLab Color Quest XE instrument operated in transmission mode. The pH of the solution was then measured. The resulting transparent, low pH (3.29) solution of S701 SPI was very light in colour and had excellent clarity (Table 10).

TABLE 10

Colour and haze readings for solution of S701 SPI from toasted soy meal in water

| sample | L* | a* | b* | haze (%) |
|---|---|---|---|---|
| S701 SPI | 96.98 | −0.97 | 9.69 | 3.1 |

Example 5

'a' g of dry soybeans were added to 'b' ml of 0.10 M CaCl$_2$ solution at ambient temperature and processed for 5 minutes at the top speed of a kitchen blender to provide an aqueous protein solution. The residual solids and the extracted fat were removed and the resulting protein solution was clarified by centrifugation and filtration to produce 'c' ml of filtered protein solution having a protein content of 'd' % by weight.

The filtered protein solution was then added to 'e' ml of water and the pH of the sample lowered to 3 with diluted HCl.

The diluted and acidified protein extract solution was reduced in volume to 'f' ml by concentration on a 'g' membrane having a molecular weight cutoff of 'h' Daltons and then an aliquot of 'i' ml of concentrated, acidified protein solution was diafiltered with 'j' ml of reverse osmosis purified water. The resulting acidified, diafiltered, concentrated protein solution had a protein content of 'k' % by weight and represented a yield of 'l' wt % of the initial filtered protein solution. The acidified, diafiltered, concentrated protein solution was dried to yield a product found to have a protein content of 'm' % (N×6.25) w.b. The product was termed S701 soy protein isolate (SPI).

The parameters 'a' to 'm' are set forth in the following Table 11:

TABLE 11

| | |
|---|---|
| a | 150 |
| b | 1,000 |
| c | 610 |
| d | 1.3 |
| e | 1,220 |
| f | 35 |
| g | Hydrosart |
| h | 10,000 |
| i | 32 |
| j | 384 |
| k | 11.85 |

TABLE 11-continued

| | |
|---|---|
| l | 53.59 |
| m | 95.34 |

The process yielded 3.69 g of S701 SPI product that dissolved well in water and produced a slightly hazy, low pH (3.19) solution that was very light in colour (Table 12, below). For some reason, the sample prepared from soybeans did not clear quite as nicely as the sample prepared from meal when the pH was lowered to 3 and the sample concentrated. Perhaps this was the influence of some residual oil that somehow escaped the filter press or else a protein species that was not extractable from the toasted meal or an effect of the differing strengths of calcium chloride used. Note that the clarity of the initial diluted and acidified extract in this Example was in line with the results achieved with soybeans in Example 2. An additional pass through the filter press after pH adjustment and prior to starting ultrafiltration or at some other point later in the process likely would have yielded a product with better clarity

TABLE 12

Colour and haze readings for solution of S701 SPI from soybeans in water

| sample | L* | a* | b* | haze (%) |
|---|---|---|---|---|
| S701 SPI | 96.12 | −0.57 | 8.87 | 21.3 |

Example 6

The procedure of Example 4 was scaled-up from bench top laboratory scale to pilot plant scale.

'a' kg of toasted soy meal was added to 'b' L of 0.15 M $CaCl_2$ solution at ambient temperature and agitated for 30 minutes to provide an aqueous protein solution. The residual soy meal was removed and the resulting protein solution was clarified by centrifugation and filtration to produce 'c' L of filtered protein solution having a protein content of 'd' % by weight.

The filtered protein solution was then added to 'e' L of water and the pH of the sample lowered to 3.03 with diluted HCl.

The diluted and acidified protein extract solution was reduced in volume to 'f' L by concentration on a 'g' membrane having a molecular weight cutoff of 'h' Daltons. An aliquot of 'i' L of concentrated, acidified protein solution was diafiltered with 'j' L of reverse osmosis purified water then pasteurized at 60° C. for 1 minute and filtered. The resulting acidified, diafiltered, concentrated protein solution had a protein content of 'k' % by weight and represented a yield of 'l' wt % of the initial filtered protein solution. The acidified, diafiltered, concentrated protein solution was dried to yield a product found to have a protein content of 'm' % (N×6.25) d.b. The product was termed S001-H05-08A S701.

The parameters 'a' to 'm' are set forth in the following Table 13:

TABLE 13

| | |
|---|---|
| a | 20 |
| b | 100 |
| c | 80 |
| d | 0.66 |
| e | 160 |
| f | 5 |
| g | Polyethersulfone (PES) |
| h | 10,000 |
| i | 5 |
| j | 25 |
| k | 6.87 |
| l | 59.46 |
| m | 100.24 |

The phytic acid content was determined by the procedure of Latta and Eskin (J. Agric. Food Chem., 28: 1313-1315) for the S701 sample provided herein and in others of the Examples. The phytic acid content of the S001-H05-08A S701 was 0.00 wt % d.b.

187 g of S701 was produced that dissolved well in water and yielded a transparent, low pH (3.35) solution that was very light in colour (Table 14, below).

TABLE 14

Colour and haze readings for solution of S001-H05-08A S701 in water

| Sample | L* | a* | b* | haze (%) |
|---|---|---|---|---|
| S001-H05-08A S701 | 95.65 | −0.31 | 9.38 | 5.6 |

The dry powder was also very light in colour (Table 15, below).

TABLE 15

Colour readings for dry S001-H05-08A S701

| sample | L* | a* | b* |
|---|---|---|---|
| S001-H05-08A S701 | 87.59 | +0.43 | 8.49 |

Example 7

This Example assesses the heat stability of soy protein isolate prepared according to the procedure of Example 6.

A solution of S001-H05-08A S701, prepared as described in Example 6, was prepared in water by dissolving sufficient S001-H05-08A S701 to supply 1 g of protein in 50 ml of RO water. The clarity of the sample was assessed by measuring the A600 and the colour was measured using a HunterLab Colour Quest XE instrument in transmission mode. The protein solution was then heated to 95° C. and held at this temperature for 30 seconds before being cooled to room temperature rapidly in ice water. The colour and clarity of the solution was then assessed again.

Heat treatment of the protein solution actually slightly improved the clarity and had little effect on the colour of the sample (Table 16, below). The maintenance of clarity under heat treatment conditions is particularly beneficial for the use of the protein in beverage systems, many of which are heated as part of their processing.

TABLE 16

Clarity and colour results for solution of S001-H05-08A S701 in water heat treated at 95° C. for 30 seconds

| sample | A600 | L* | a* | b* | haze (%) |
|---|---|---|---|---|---|
| before heating | 0.048 | 97.25 | −0.24 | 6.25 | 8.1 |
| after heating | 0.038 | 97.25 | −0.16 | 6.16 | 5.0 |

Example 8

This Example was performed to evaluate the effect of extraction solution properties on the yield of protein extracted from toasted soy meal and to determine if a high pH calcium chloride extraction would generate a transparent solution at pH 3.

Samples of toasted soy meal (10 g) were combined with 100 ml of the following solvents:
Water
Water plus sufficient diluted NaOH to raise the pH of the extraction to 8.50
0.05 M $CaCl_2$
0.10 M $CaCl_2$
0.15 M $CaCl_2$
0.15 M $CaCl_2$ plus sufficient diluted NaOH to raise the pH of the extraction to 8.79
0.05 M NaCl
0.10 M NaCl
0.15 M NaCl
0.15 M NaCl plus sufficient diluted NaOH to raise the pH of the extraction to 8.64

The samples were mixed for 30 minutes using an orbital shaker platform. Small samples were then clarified using a 0.45 μm pore size syringe filter and the protein content of the filtered solutions determined by Leco analysis. Small samples of the clarified, high pH sodium chloride and calcium chloride extracts were diluted with 2 parts water and the pH of the sample adjusted to 3 with diluted HCl. The clarity of the samples was then assessed visually.

Increasing the calcium chloride concentration appeared to increase the amount of protein extracted from the meal (Table 17, below). The number recorded for the 0.05M extract was extremely low, likely due to experimental error in the measurement. Increasing the concentration of sodium chloride in the extraction had less of an impact in increasing the amount of protein extracted. Conducting the extraction at high pH appeared to result in a significant increase in the amount of protein extracted regardless of the solvent type. The highest yield obtained was for the 0.15M $CaCl_2$ extraction at high pH. When this sample was diluted with water a precipitate formed but this material re-solubilized and the sample was completely clear when the pH was lowered to 3. This suggested that the calcium treatment process to produce a soy protein isolate, soluble and transparent at low pH can be combined with an alkaline extraction to improve the yield if desired. It was observed that the higher pH extraction samples were a darker yellow colour than the natural pH extractions although this may just be a function of the higher protein concentrations. Dilution of the pH 8.64 sodium chloride extract with water did not result in the formation of any haze or precipitate. Lowering the pH of the sample to 3 did result in the formation of haze and precipitation.

TABLE 17

Protein content of various clarified extracts

| extraction solution | % protein |
|---|---|
| water | 0.37 |
| water, pH 8.50 | 0.48 |
| 0.05 M $CaCl_2$ | 0.03 |
| 0.10 M $CaCl_2$ | 0.38 |
| 0.15 M $CaCl_2$ | 0.47 |
| 0.15 M $CaCl_2$, pH 8.79 | 0.81 |
| 0.05 M NaCl | 0.25 |
| 0.10 M NaCl | 0.24 |

TABLE 17-continued

Protein content of various clarified extracts

| extraction solution | % protein |
|---|---|
| 0.15 M NaCl | 0.32 |
| 0.15 M NaCl, pH 8.64 | 0.68 |

Example 9

This Example illustrates extraction of another soy source with water, sodium chloride and calcium chloride and the effect of acidification on clarity.

Defatted, minimally heat processed soy flour (10 g) was extracted with either water, 0.15 M NaCl or 0.15 M $CaCl_2$ (100 ml) using a stir bar/stir plate for 30 minutes at room temperature. The samples were then centrifuged at 10,200 g for 10 minutes to separate extract from the residual solids. The supernatant was then further clarified by filtration through 25 μm pore size filter paper and a 0.45 μm pore size syringe filter then analyzed for pH, conductivity, clarity (A600) and protein content (Leco). A clarified sample of each extract was diluted into 4 parts room temperature water and the A600 measured again. Diluted and undiluted extract samples were acidified to pH 3 with diluted HCl and the clarity measured again. Small amounts of $CaCl_2$ were also added to samples of the post 25 μm water and sodium chloride extracts and the conductivity measured. The mixtures were then centrifuged at 7,800 g for 10 minutes and the supernatants filtered with a 0.45 μm pore size syringe filter. The pH, protein content and A600 of these supernatants were measured and then the pH was lowered to 3 and the A600 measured again.

After centrifugation, the supernatant from the calcium chloride extraction appeared to be the clearest sample while the supernatant from the sodium chloride extraction was a little bit cloudy and the supernatant from the water extraction was very cloudy. Even after filtering the sample, the water extract was still hazy (Table 18, below). The extractability of the soy flour was very good for all the extraction solutions, particularly the water.

TABLE 18

Properties of initial extracts

| sample | A600 | % protein | cond. (mS) |
|---|---|---|---|
| water | 0.285 | 3.53 | 4.25 |
| 0.15 M NaCl | 0.028 | 2.84 | 17.20 |
| 0.15 M $CaCl_2$ | 0.058 | 2.90 | 23.80 |

When the undiluted samples were acidified to pH 3, only the calcium chloride extract stayed clear (Table 19, below). This result indicates that the dilution step may not be necessary for the generation of the soy protein product that is soluble and produces transparent solutions at low pH.

TABLE 19

Effect of acidification on clarity of full strength extracts

| sample | initial pH | final pH | final A600 |
|---|---|---|---|
| water | 6.59 | 3.04 | >3.0 |
| 0.15 M NaCl | 6.44 | 3.01 | >3.0 |
| 0.15 M $CaCl_2$ | 5.44 | 3.04 | 0.060 |

When a dilution step was applied, again the calcium chloride extract was the only sample that was clear at pH 3 (Table 20, below).

TABLE 20

Effect of acidification on clarity of diluted extracts

| sample | initial pH | initial A600 | final pH | final A600 |
|---|---|---|---|---|
| water | 6.72 | 0.028 | 2.90 | 0.860 |
| 0.15 M NaCl | 6.75 | 0.443 | 3.03 | 2.765 |
| 0.15 M CaCl$_2$ | 5.66 | 2.827 | 2.96 | 0.032 |

Addition of calcium chloride to the water extract raised the conductivity of the sample to 7.76 mS. The conductivity of the sodium chloride extract was raised to 22.10 mS with calcium chloride. Both samples contained significant amounts of precipitate after the calcium chloride was added but were clarified by the centrifugation and filtration steps. Significant amounts of protein were lost in the clarification process, with the clarified water/CaCl$_2$ extract testing at 1.19% protein and the NaCl/CaCl$_2$ extract testing at 2.27% protein. The water extract with the added calcium stayed clear upon acidification to pH 3 while the NaCl/CaCl$_2$ extract went cloudy (Table 21, below). Interestingly, both of these extract samples, if diluted with water before the acidification, gave clear solutions at pH 3 (data not shown). The water/CaCl$_2$ sample was clear upon both dilution and acid addition. The NaCl/CaCl$_2$ sample precipitated upon dilution but went clear when the pH was lowered to 3.

TABLE 21

Effect of acidification on clarity of extracts with added calcium chloride

| sample | initial pH | initial A600 | final pH | final A600 |
|---|---|---|---|---|
| water/CaCl$_2$ | 5.69 | 0.014 | 3.04 | 0.062 |
| NaCl/CaCl$_2$ | 5.48 | 0.044 | 2.96 | 1.889 |

Example 10

This Example illustrates the production of soy protein isolate on a pilot plant scale using organic soy flour purchased at a bulk food store.

'a' kg of soy flour was added to 'b' L of 0.15 M CaCl$_2$ solution at ambient temperature and agitated for 30 minutes to provide an aqueous protein solution. The residual soy flour and fat phase was removed and the resulting protein solution was clarified by centrifugation and filtration to produce 'c' L of filtered protein solution having a protein content of 'd' % by weight.

The filtered protein solution was then added to 'e' L of water and the pH of the sample lowered to 3.05 with dilute HCl.

The diluted and acidified protein extract solution was reduced in volume to 'f' L by concentration on a 'g' membrane having a molecular weight cutoff of 'h' Daltons. The concentrated, acidified protein solution was diafiltered with 'i' L of reverse osmosis purified water. The resulting acidified, diafiltered, concentrated protein solution had a protein content of 'j' % by weight and represented a yield of 'k' wt % of the initial filtered protein solution. The acidified, diafiltered, concentrated protein solution was diluted with an equal volume of water and filtered. The protein solution was then dried to yield a product found to have a protein content of 'l' wt % (N×6.25) d.b. and a phytic acid content of 'm' wt %. The product was termed S003-I18-08A S701.

Parameters 'a' to 'm' are shown in the following Table 22:

TABLE 22

| a | 8.12 |
|---|---|
| b | 81 |
| c | 76 |
| d | 1.10 |
| e | 76 |
| f | 5 |
| g | PES |
| h | 10,000 |
| i | 25 |
| j | 12.73 |
| k | 73.1 |
| l | 103.01 |
| m | 0.01 |

When the S003-I18-08A S701 was dissolved in water, the resulting solution (pH 3.33) was transparent and very light in colour, as seen in the following Table 23.

TABLE 23

Colour and haze readings for solution of S003-I18-08A S701 in water

| sample | L* | a* | b* | haze (%) |
|---|---|---|---|---|
| S003-I18-08A S701 | 96.74 | −0.23 | 6.67 | 4.7 |

The dry powder was also very light in colour as seen in the following Table 24:

TABLE 24

Colour readings for dry S003-I18-08A S701

| sample | L* | a* | b* |
|---|---|---|---|
| S003-I18-08A S701 | 88.03 | +0.35 | 5.90 |

Example 11

This Example illustrates the production of soy protein isolate on a pilot plant scale using defatted, minimally heat processed soy flour.

'a' kg of soy flour was added to 'b' L of 0.15 M CaCl$_2$ solution at ambient temperature and agitated for 30 minutes to provide an aqueous protein solution. The residual soy flour was removed and the resulting protein solution was clarified by centrifugation and filtration to produce 'c' L of filtered protein solution having a protein content of 'd' % by weight.

The filtered protein solution was then added to 'e' L of water and the pH of the sample lowered to 3.01 with dilute HCl.

The diluted and acidified protein extract solution was reduced in volume to 'f' L by concentration on a 'g' membrane having a molecular weight cutoff of 'h' Daltons. The concentrated, acidified protein solution was diafiltered with 'i' L of reverse osmosis purified water. The resulting acidified, diafiltered, concentrated protein solution had a protein content of 'j' % by weight and represented a yield of 'k' wt % of the initial filtered protein solution. The acidified, diafiltered, concentrated protein solution was then dried to yield a product found to have a protein content of 'l' wt % (N×6.25) d.b. and a phytic acid content of 'm' wt % d.b. The product was termed S004-J02-08A S701.

Parameters 'a' to 'm' are shown in the following Table 25:

TABLE 25

| | |
|---|---|
| a | 10 |
| b | 100 |
| c | 94 |
| d | 1.26 |
| e | 94 |
| f | 7 |
| g | PES |
| h | 10,000 |
| i | 28 |
| j | 12.66 |
| k | 74.02 |
| l | 101.22 |
| m | 0.16 |

When the S004-J02-08A S701 isolate was dissolved in water, the resulting solution (pH 3.09) was transparent and very light in colour, as seen in the following Table 26:

TABLE 26

Colour and haze readings for solution of S004-J02-08A S701 in water

| sample | L* | a* | b* | haze (%) |
|---|---|---|---|---|
| S004-J02-08A S701 | 97.92 | −1.21 | 7.72 | 1.2 |

The dry powder was also very light in colour as seen in the following Table 27:

TABLE 27

Colour readings for dry S004-J02-08A S701

| sample | L* | a* | b* |
|---|---|---|---|
| S004-J02-08A S701 | 87.02 | −0.82 | 10.32 |

Example 12

This Example illustrates the production of the novel, acid soluble soy protein isolate (S701).

'a' kg of defatted, minimally heat processed soy flour was added to 'b' L of 0.15 M $CaCl_2$ solution at ambient temperature and agitated for 60 minutes to provide an aqueous protein solution. The residual soy meal was removed and the resulting protein solution was clarified by centrifugation and filtration to produce 'c' L of filtered protein solution having a protein content of 'd' % by weight.

The filtered protein solution was then added to 'e' L of reverse osmosis purified water and the pH of the sample lowered to 'f' with diluted HCl.

The diluted and acidified protein extract solution was reduced in volume to 'g' L by concentration on a 'h' membrane having a molecular weight cutoff of 'i' Daltons. The concentrated, acidified protein solution was diafiltered with 'j' L of reverse osmosis purified water. The resulting acidified, diafiltered, concentrated protein solution had a protein content of 'k' % by weight and represented a yield of 'l' wt % of the initial filtered protein solution. The acidified, diafiltered, concentrated protein solution was then dried to yield a product found to have a protein content of 'm' % (N×6.25) d.b. The product was given designation 'n' S701.

The parameters 'a' to 'n' for three runs are set forth in the following Table 28:

TABLE 28

Parameters for the runs to produce S701

| n | S005-K18-08A | S005-K24-08A | S005-L08-08A |
|---|---|---|---|
| a | 60 | 60 | 20 |
| b | 600 | 600 | 200 |
| c | 410 | 360 | 170 |
| d | 2.63 | 2.53 | 2.03 |
| e | 410 | 360 | 170 |
| f | 3.07 | 3.07 | 3.06 |
| g | 70 | 81 | 49 |
| h | PES | PES | PES |
| i | 10,000 | 10,000 | 10,000 |
| j | 350 | 405 | 250 |
| k | 13.34 | 13.52 | N/A |
| l | 89.6 | 91.1 | N/A |
| m | 102.71 | 103.19 | 105.54 |

N/A = not available

When the S701 isolate samples were dissolved in water, the resulting low pH solutions were transparent and very light in colour as may be seen from the following Table 28A.

TABLE 28A pH, colour and haze readings for solutions of S701 in water

| Sample | pH | L* | a* | b* | haze (%) |
|---|---|---|---|---|---|
| S005-K18-08A S701 | 3.31 | 97.95 | −1.33 | 8.27 | 1.4 |
| S005-K24-08A S701 | 3.26 | 98.06 | −1.35 | 8.10 | 0.3 |
| S005-L08-08A S701 | 3.35 | 97.33 | −1.00 | 8.03 | 1.0 |

Example 13

This Example illustrates the production of a soy protein isolate by the protein micellar mass method.

10 kg of defatted, minimally heat processed soy flour was added to 200 L of 0.5 M NaCl solution at ambient temperature and agitated for 60 minutes to provide an aqueous protein solution. The residual soy flour was removed and the resulting protein solution was clarified by centrifugation and filtration to produce 165 L of filtered protein solution having a protein content of 1.34% by weight.

The protein extract solution was reduced to 12.06 kg by concentration on a PES membrane having a molecular weight cutoff of 100,000 Daltons, producing a concentrated protein solution with a protein content of 17.51% by weight.

The concentrated solution at 30° C. was diluted 1:5 into cold RO water having a temperature of 4° C. A white cloud formed immediately and was allowed to settle. The upper diluting water was removed and the precipitated, viscous, sticky mass (PMM) was recovered from the bottom of the vessel in a yield of 20.8 wt % of the filtered protein solution. The dried PMM derived protein was found to have a protein content of 99.66% (N×6.25) d.b. The product was given a designation S005-K19-08A S300.

Example 14

This Example contains an evaluation of the solubility in water of the soy protein isolate produced by the method of Example 12 (S701), soy protein isolate produced by the PMM method of Example 13 (S300) and two commercial soy protein isolates, namely Pro Fam 825 and Pro Fam 873 (ADM, Decatur, Ill.), products indicated by the manufacturer as being highly soluble. Solubility was tested based on protein solubility (termed protein method, a modified version of the procedure of Morr et al., J. Food Sci. 50:1715-1718) and total product solubility (termed pellet method).

Sufficient protein powder to supply 0.5 g of protein was weighed into a beaker and then a small amount of reverse osmosis (RO) purified water was added and the mixture stirred until a smooth paste formed. Additional water was then added to bring the volume to approximately 45 ml. The contents of the beaker were then slowly stirred for 60 minutes using a magnetic stirrer. The pH was determined immediately after dispersing the protein and was adjusted to the appropriate level (2, 3, 4, 5, 6 or 7) with diluted NaOH or HCl. A sample was also prepared at natural pH. For the pH adjusted samples, the pH was measured and corrected two times during the 60 minutes stirring. After the 60 minutes of stirring, the samples were made up to 50 ml total volume with RO water, yielding a 1% protein w/v dispersion. The protein content of the dispersions was measured using a Leco FP528 Nitrogen Determinator. Aliquots (20 ml) of the dispersions were then transferred to pre-weighed centrifuge tubes that had been dried overnight in a 100° C. oven then cooled in a desiccator and the tubes capped. The samples were centrifuged at 7,800 g for 10 minutes, which sedimented insoluble material and yielded a clear supernatant. The protein content of the supernatant was measured by Leco analysis and then the supernatant and the tube lids were discarded and the pellet material dried overnight in an oven set at 100° C. The next morning the tubes were transferred to a desiccator and allowed to cool. The weight of dry pellet material was recorded. The dry weight of the initial protein powder was calculated by multiplying the weight of powder used by a factor of ((100−moisture content of the powder (%))/100). Solubility of the product was then calculated two different ways:

Solubility (protein method) (%)=(% protein in supernatant/% protein in initial dispersion)×100    1)

Solubility (pellet method) (%)=(1−(weight dry insoluble pellet material/((weight of 20 ml of dispersion/weight of 50 ml of dispersion)×initial weight dry protein powder)))×100    2)

The natural pH values of the protein isolates produced in Examples 12 and 13 and the commercial isolates in water are shown in the following Table 29:

TABLE 29

Natural pH of dispersions prepared in water at 1% protein w/v

| Batch | Product | Natural pH |
|---|---|---|
| S005-K18-08A | S701 | 3.21 |
| S005-K24-08A | S701 | 3.36 |
| S005-L08-08A | S701 | 3.35 |
| S005-K19-08A | S300 | 6.76 |
|  | Pro Fam 825 | 7.23 |
|  | Pro Fam 873 | 7.19 |

The solubility results obtained are set forth in the following Tables 30 and 31:

TABLE 30

Solubility of products at different pH values based on protein method

| | | Solubility (protein method) (%) | | | | | | |
|---|---|---|---|---|---|---|---|---|
| Batch | Product | pH 2 | pH 3 | pH 4 | pH 5 | pH 6 | pH 7 | Nat. pH |
| S005-K18-08A | S701 | 97.1 | 99.1 | 100.0 | 1.0 | 26.2 | 94.4 | 98.0 |
| S005-K24-08A | S701 | 97.8 | 99.0 | 95.2 | 15.2 | 27.6 | 100.0 | 100.0 |
| S005-L08-08A | S701 | 100.0 | 100.0 | 100.0 | 4.2 | 28.6 | 100.0 | 100.0 |
| S005-K19-08A | S300 | 100.0 | 100.0 | 85.3 | 8.1 | 23.7 | 100.0 | 94.7 |
|  | Pro Fam 825 | 50.0 | 32.6 | 12.1 | 8.3 | 56.1 | 49.5 | 58.4 |
|  | Pro Fam 873 | 57.4 | 31.1 | 23.2 | 13.5 | 29.9 | 42.9 | 45.2 |

TABLE 31

Solubility of products at different pH values based on pellet method

| | | Solubility (pellet method) (%) | | | | | | |
|---|---|---|---|---|---|---|---|---|
| Batch | Product | pH 2 | pH 3 | pH 4 | pH 5 | pH 6 | pH 7 | Nat. pH |
| S005-K18-08A | S701 | 100.0 | 100.0 | 100.0 | 24.3 | 37.5 | 99.0 | 97.1 |
| S005-K24-08A | S701 | 99.8 | 100.0 | 99.9 | 20.2 | 40.4 | 91.5 | 98.7 |
| S005-L08-08A | S701 | 100.0 | 100.0 | 100.0 | 66.8 | 72.4 | 99.7 | 100.0 |
| S005-K19-08A | S300 | 96.5 | 96.1 | 76.3 | 5.7 | 29.1 | 93.1 | 86.8 |
|  | Pro Fam 825 | 48.5 | 30.1 | 15.3 | 17.5 | 50.6 | 53.7 | 54.1 |
|  | Pro Fam 873 | 49.7 | 30.9 | 18.4 | 18.0 | 36.6 | 42.7 | 43.1 |

As can be seen from the results of Tables 30 and 31, the S701 products were far more soluble than the commercial isolates in the range of pH 2 to 4 and also at pH 7 regardless of the solubility testing method used. The excellent solubility in the low pH range is a key factor in the applicability of the S701 product for use in acidic beverages. The solubility of the S300 product followed a similar pattern to the S701, except that the solubility at pH 4 was not quite as good, although still better than the commercial products.

Example 15

This Example contains an evaluation of the clarity in water of the soy protein isolate produced by the method of Example 12 (S701), soy protein isolate produced by the PMM method of Example 13 (S300) and the commercial soy protein isolates Pro Fam 825 and Pro Fam 873.

The clarity of the 1% protein w/v dispersions prepared as described in Example 14 was assessed by measuring the absorbance of visible light at 600 nm (A600) with water used to blank the spectrophotometer. Analysis of the samples on a HunterLab ColorQuest XE instrument in transmission mode also provided a percentage haze reading, another measure of clarity. For both tests, a lower score indicated greater clarity.

The clarity results are set forth in the following Tables 32 and 33:

TABLE 32

Clarity of solutions at different pH values as assessed by A600

| | | A600 | | | | | | |
|---|---|---|---|---|---|---|---|---|
| Batch | Product | pH 2 | pH 3 | pH 4 | pH 5 | pH 6 | pH 7 | Nat. pH |
| S005-K18-08A | S701 | 0.007 | 0.009 | 0.023 | >3.0 | >3.0 | 0.225 | 0.013 |
| S005-K24-08A | S701 | 0.013 | 0.014 | 0.028 | >3.0 | >3.0 | 0.355 | 0.014 |
| S005-L08-08A | S701 | 0.014 | 0.018 | 0.028 | >3.0 | >3.0 | 0.174 | 0.026 |
| S005-K19-08A | S300 | 0.059 | 0.117 | 1.995 | >3.0 | >3.0 | 0.319 | 0.468 |
| | Pro Fam 825 | 2.842 | >3.0 | >3.0 | >3.0 | 2.944 | 2.891 | 2.879 |
| | Pro Fam 873 | 2.765 | 2.907 | >3.0 | >3.0 | 2.875 | 2.824 | 2.806 |

TABLE 33

Clarity of solutions at different pH values as assessed by HunterLab analysis

| | | HunterLab haze reading (%) | | | | | | |
|---|---|---|---|---|---|---|---|---|
| Batch | Product | pH 2 | pH 3 | pH 4 | pH 5 | pH 6 | pH 7 | Nat. pH |
| S005-K18-08A | S701 | N/A | N/A | N/A | N/A | N/A | N/A | N/A |
| S005-K24-08A | S701 | 0.0 | 0.0 | 0.2 | 94.5 | 94.4 | 47.0 | 0.0 |
| S005-L08-08A | S701 | 0.0 | 0.0 | 0.0 | 93.5 | 93.3 | 20.2 | 0.0 |
| S005-K19-08A | S300 | 5.8 | 16.9 | 92.4 | 93.4 | 93.4 | 40.2 | 54.1 |
| | Pro Fam 825 | N/A | N/A | N/A | N/A | N/A | N/A | N/A |
| | Pro Fam 873 | 95.1 | 95.4 | 95.6 | 95.7 | 95.6 | 95.3 | 95.3 |

N/A = not available

As can be seen from the results of Tables 32 and 33, solutions of S701 prepared in the pH range 2 to 4 were extremely clear, regardless of the method used to assess clarity. The commercial isolates were extremely cloudy at all pH values tested. The S300 was fairly clear at pH 2 to 3 but not as sharp as the S701 solutions. At pH 4, the S300 solution was quite cloudy. Solutions of S701 and S300 were clearer than the commercial isolates at pH 7, but the solutions at this pH were not nearly as clear as the acidic solutions.

Example 16

This Example contains an evaluation of the heat stability in water of the soy protein isolates produced by the method of Example 12 (S701). Solutions of S701 were produced by dissolving sufficient S701 to supply 0.8 g of protein in 40 ml of water. The pH was then adjusted to 3 if necessary. The clarity of these solutions was assessed by haze measurement with the HunterLab Color Quest XE instrument. The solutions were then heated to 95° C., held at this temperature for 30 seconds and then immediately cooled to room temperature in an ice bath. The clarity of the heat treated solutions was then measured again.

The clarity of the protein solutions before and after heating is set forth in the following Table 34:

TABLE 34

Effect of heat treatment on clarity of solutions

| batch | product | haze (%) before heating | haze (%) after heating |
|---|---|---|---|
| S005-K18-08A | S701 | 0.0 | 0.0 |
| S005-K24-08A | S701 | 0.0 | 0.0 |
| S005-L08-08A | S701 | 0.0 | 0.0 |

As can be seen from the results in Table 34, the solutions of S701 were initially completely clear and remained so after heat treatment.

Example 17

This Example contains an evaluation of the solubility in a soft drink (Sprite) and sports drink (Orange Gatorade) of the soy protein isolate produced by the method of Example 12 (S701), soy protein isolate produced by the PMM method of Example 13 (S300) and the commercial soy protein isolates Pro Fam 825 and Pro Fam 873. The solubility was determined with the protein added to the beverages with no pH correction and again with the pH of the protein fortified beverages adjusted to the level of the original beverages.

When the solubility was assessed with no pH correction, a sufficient amount of protein powder to supply 1 g of protein was weighed into a beaker and a small amount of beverage was added and stirred until a smooth paste formed. Additional beverage was added to bring the volume to 50 ml, and then the solutions were stirred slowly on a magnetic stirrer for 60 minutes to yield a 2% protein w/v dispersion. The protein content of the samples was analyzed using a LECO FP528 Nitrogen Determinator then an aliquot of the protein containing beverages was centrifuged at 7,800 g for 10 minutes and the protein content of the supernatant measured.

Solubility (%)=(% protein in supernatant/% protein in initial dispersion)×100

When the solubility was assessed with pH correction, the pH of the soft drink (Sprite) (3.39) and sports drink (Orange Gatorade) (3.19) without protein was measured. A sufficient amount of protein powder to supply 1 g of protein was weighed into a beaker and a small amount of beverage was added and stirred until a smooth paste formed. Additional beverage was added to bring the volume to approximately 45 ml, and then the solutions were stirred slowly on a magnetic stirrer for 60 minutes. The pH of the protein containing beverages was measured and then adjusted to the original no-protein pH with HCl or NaOH as necessary. The total volume of each solution was then brought to 50 ml with additional beverage, yielding a 2% protein w/v dispersion. The protein content of the samples was analyzed using a LECO FP528 Nitrogen Determinator then an aliquot of the protein containing beverages was centrifuged at 7,800 g for 10 minutes and the protein content of the supernatant measured.

Solubility (%)=(% protein in supernatant/% protein in initial dispersion)×100

The results obtained are set forth in the following Table 35:

TABLE 35

Solubility of products in Sprite and Orange Gatorade

| | | no pH correction | | pH correction | |
|---|---|---|---|---|---|
| Batch | Product | Solubility (%) in Sprite | Solubility (%) in Orange Gatorade | Solubility (%) in Sprite | Solubility (%) in Orange Gatorade |
| S005-K18-08A | S701 | 100.0 | 98.0 | 100.0 | 91.7 |
| S005-K24-08A | S701 | 98.9 | 100 | 97.1 | 100 |
| S005-L08-08A | S701 | 100.0 | 93.4 | 100.0 | 100 |
| S005-K19-08A | S300 | 4.8 | 71.0 | 95.3 | 85.2 |
| | Pro Fam 825 | 5.5 | 19.0 | 26.6 | 33.0 |
| | Pro Fam 873 | 12.1 | 16.4 | 23.2 | 26.5 |

As can be seen from the results of Table 35, the S701 product was extremely soluble in the Sprite and the Orange Gatorade. The S701 is an acidified product and had little effect on the pH of the beverages. The S300 and the commercial isolates were not acidified products. The solubility of these products was somewhat improved by correcting the pH of the beverages. However, even after pH correction the commercial isolates were far less soluble than the S701. The S300 was slightly less soluble than the S701 after pH correction.

Example 18

This Example contains an evaluation of the clarity in a soft drink and sports drink of the soy protein isolate produced by the method of Example 12 (S701), soy protein isolate produced by the PMM method of Example 13 (S300) and commercial soy protein isolates Pro Fam 825 and Pro Fam 873.

The clarity of the 2% protein w/v dispersions prepared in soft drink (Sprite) and sports drink (Orange Gatorade) in Example 17 was assessed using the methods described in Example 15 but with the appropriate beverage used to blank the spectrophotometer for the absorbance measurements at 600 nm.

The results obtained are set forth in the following Tables 36 and 37:

TABLE 36

Clarity (A600) of products in Sprite and Orange Gatorade

| | | no pH correction | | pH correction | |
|---|---|---|---|---|---|
| Batch | Product | A600 in Sprite | A600 in Orange Gatorade | A600 in Sprite | A600 in Orange Gatorade |
| S005-K18-08A | S701 | 0.017 | 0.000 | 0.016 | 0.000 |
| S005-K24-08A | S701 | 0.017 | 0.000 | 0.007 | 0.000 |
| S005-L08-08A | S701 | 0.030 | 0.000 | 0.035 | 0.010 |
| S005-K19-08A | S300 | >3.0 | >3.0 | 1.339 | 1.028 |
| | Pro Fam 825 | >3.0 | 2.972 | >3.0 | >3.0 |
| | Pro Fam 873 | >3.0 | 2.961 | >3.0 | >3.0 |

TABLE 37

HunterLab haze readings for products in Sprite and Orange Gatorade

| | | no pH correction | | pH correction | |
|---|---|---|---|---|---|
| Batch | Product | haze (%) in Sprite | haze (%) in Orange Gatorade | haze (%) in Sprite | haze (%) in Orange Gatorade |
| no protein | | 0.0 | 44.0 | 0.0 | 44.0 |
| S005-K18-08A | S701 | 0.0 | 38.5 | 5.4 | 47.6 |
| S005-K24-08A | S701 | 0.0 | 39.7 | 0.0 | 41.4 |
| S005-L08-08A | S701 | 0.0 | 40.8 | 8.4 | 48.6 |
| S005-K19-08A | S300 | 93.6 | 93.5 | 94.9 | 86.3 |
| | Pro Fam 825 | 93.3 | 93.7 | 90.8 | 91.4 |
| | Pro Fam 873 | 93.4 | 94.2 | 90.9 | 91.9 |

As can be seen from the results of Tables 36 and 37, the S701 product had minimal effect on the clarity of the Sprite and Orange Gatorade. Addition of the commercial isolates and the S300 made these beverages very cloudy, even after pH correction.

Example 19

This Example contains an evaluation of the solubility in alcoholic beverages of the soy protein isolate produced by the method of Example 12 (S701), soy protein isolate produced by the PMM method of Example 13 (S300) and commercial soy protein isolates Pro Fam 825 and Pro Fam 873. The solubility was determined with the protein added to the beverages with no pH correction and again with the pH of the protein fortified beverages adjusted to the level of the original beverages.

When the solubility was assessed with no pH correction, a sufficient amount of protein powder to supply 1 g of protein was weighed into a beaker and a small amount of beverage was added and stirred until a smooth paste formed. Additional beverage was added to bring the volume to 50 ml, and then the solutions were stirred slowly on a magnetic stirrer for 60 minutes to yield a 2% protein w/v dispersion. The protein content of the samples was analyzed using a LECO FP528 Nitrogen Determinator then an aliquot of the protein containing beverages was centrifuged at 7,800 g for 10 minutes and the protein content of the supernatant measured.

Solubility (%)=(% protein in supernatant/% protein in initial dispersion)×100

When the solubility was assessed with pH correction, the pH of the Miller Genuine Draft beer (4.05), Bacardi Breezer Strawberry Daiquiri (3.60) and Pomtini Vodka and Pomegranate Cooler (3.36) without protein was measured. A sufficient amount of protein powder to supply 1 g of protein was weighed into a beaker and a small amount of beverage was added and stirred until a smooth paste formed. Additional beverage was added to bring the volume to 50 ml, and then the solutions were stirred slowly on a magnetic stirrer for 60 minutes to yield a 2% protein w/v dispersion. The pH of the protein containing beverages was measured and then adjusted to the original no-protein pH with HCl or NaOH as necessary. The protein content of the samples was analyzed using a LECO FP528 Nitrogen Determinator then an aliquot of the protein containing beverages was centrifuged at 7,800 g for 10 minutes and the protein content of the supernatant measured.

Solubility (%)=(% protein in supernatant/% protein in initial dispersion)×100

The results obtained are set forth in the following Tables 38 and 39:

TABLE 38

Solubility of products in alcoholic beverages with no pH correction

| Batch | Product | Solubility (%) Miller Genuine Draft Beer | Solubility (%) in Bacardi Breezer | Solubility (%) in Pomtimi Cooler |
|---|---|---|---|---|
| S005-K18-08A | S701 | 98.6 | 100 | 98.9 |
| S005-K24-08A | S701 | 100 | 100 | 99.0 |
| S005-L08-08A | S701 | 100 | 100 | 100 |
| S005-K19-08A | S300 | 18.9 | 25.8 | 32.2 |
| | Pro Fam 825 | 30.1 | 14.8 | 22.3 |
| | Pro Fam 873 | 35.0 | 23.3 | 26.4 |

TABLE 39

Solubility of products in alcoholic beverages with pH correction

| Batch | Product | Solubility (%) Miller Genuine Draft Beer | Solubility (%) in Bacardi Breezer | Solubility (%) in Pomtimi Cooler |
|---|---|---|---|---|
| S005-K18-08A | S701 | 97.2 | 98.9 | 95.3 |
| S005-K24-08A | S701 | 100 | 98.3 | 97.9 |
| S005-L08-08A | S701 | 99.4 | 98.3 | 100 |
| S005-K19-08A | S300 | 33.3 | 63.3 | 73.7 |
| | Pro Fam 825 | 22.4 | 26.1 | 16.0 |
| | Pro Fam 873 | 23.3 | 34.2 | 22.0 |

As can be seen from the results of Tables 38 and 39, the S701 product was extremely soluble in the alcoholic beverages. As the S701 is an acidified product, its addition did not alter the pH of the beverages as much as the neutral S300 and commercial isolates. The solubility of the S300 was somewhat improved by correcting the pH of the beverages, but was still notably poorer than the solubility of the S701. The commercial isolates were poorly soluble regardless of whether the pH of the beverages was corrected.

Example 20

This Example contains an evaluation of the clarity and heat stability in alcoholic beverages of the soy protein isolate produced by the method of Example 12 (S701), soy protein isolate produced by the PMM method of Example 13 (S300) and commercial soy protein isolates Pro Fam 825 and Pro Fam 873.

The clarity of the protein dispersions prepared in alcoholic beverages in Example 19 was assessed using the methods described in Example 15 but with the appropriate beverage used to blank the spectrophotometer for the absorbance measurements at 600 nm. Heat stability was assessed by heating an aliquot of the protein containing alcoholic beverages to 95° C. and holding the samples at this temperature for 30 seconds.

The samples were then immediately cooled to room temperature in an ice bath and the clarity measured again. The appropriate unheated, no-protein beverage was used to blank the spectrophotometer for the absorbance measurements at 600 nm.

The results obtained are set forth in the following Tables 40 to 43:

TABLE 40

Clarity (A600) of products in alcoholic beverages before and after heat treatment (no pH correction)

| Batch | Product | Miller Genuine Draft | | Bacardi Breezer | | Pomtini Cooler | |
|---|---|---|---|---|---|---|---|
| | | A600 before heating | A600 after heating | A600 before heating | A600 after heating | A600 before heating | A600 after heating |
| S005-K18-08A | S701 | 0.032 | 0.002 | 0.117 | 0.096 | 0.163 | 0.089 |
| S005-K24-08A | S701 | 0.031 | 0.010 | 0.065 | 0.091 | 0.187 | 0.092 |
| S005-L08-08A | S701 | 0.056 | 0.021 | 0.095 | 0.100 | 0.203 | 0.093 |
| S005-K19-08A | S300 | >3.0 | >3.0 | >3.0 | >3.0 | >3.0 | >3.0 |
| | Pro Fam 825 | >3.0 | >3.0 | >3.0 | >3.0 | >3.0 | >3.0 |
| | Pro Fam 873 | >3.0 | >3.0 | >3.0 | >3.0 | >3.0 | >3.0 |

TABLE 41

Clarity (A600) of products in alcoholic beverages before and after heat treatment (with pH correction)

| Batch | Product | Miller Genuine Draft | | Bacardi Breezer | | Pomtini Cooler | |
|---|---|---|---|---|---|---|---|
| | | A600 before heating | A600 after heating | A600 before heating | A600 after heating | A600 before heating | A600 after heating |
| S005-K18-08A | S701 | 0.082 | 0.071 | 0.076 | 0.036 | 0.208 | 0.160 |
| S005-K24-08A | S701 | 0.035 | 0.034 | 0.059 | 0.045 | 0.213 | 0.150 |
| S005-L08-08A | S701 | 0.369 | 0.302 | 0.098 | 0.056 | 0.251 | 0.178 |
| S005-K19-08A | S300 | >3.0 | >3.0 | 2.444 | 1.830 | 2.498 | 0.707 |
| | Pro Fam 825 | >3.0 | >3.0 | >3.0 | >3.0 | >3.0 | >3.0 |
| | Pro Fam 873 | >3.0 | >3.0 | >3.0 | >3.0 | >3.0 | >3.0 |

TABLE 42

HunterLab haze readings for products in alcoholic beverages before and after heat treatment (no pH correction)

| Batch | Product | Miller Genuine Draft | | Bacardi Breezer | | Pomtini Cooler | |
|---|---|---|---|---|---|---|---|
| | | haze (%) before heating | haze (%) after heating | haze (%) before heating | haze (%) after heating | haze (%) before heating | haze (%) after heating |
| no protein | | 0.0 | N/A | 29.1 | N/A | 17.2 | N/A |
| S005-K18-08A | S701 | 1.9 | 0.0 | 33.4 | 25.5 | 19.8 | 10.4 |
| S005-K24-08A | S701 | 5.4 | 0.7 | 30.3 | 24.9 | 23.5 | 12.4 |
| S005-L08-08A | S701 | 6.1 | 1.4 | 33.8 | 26.5 | 23.6 | 12.7 |
| S005-K19-08A | S300 | 93.3 | 93.2 | 94.1 | 94.0 | 95.3 | 93.7 |
| | Pro Fam 825 | 93.0 | 92.7 | 94.0 | 94.9 | 97.6 | 96.3 |
| | Pro Fam 873 | 93.2 | 93.1 | 94.4 | 94.3 | 95.1 | 94.8 |

N/A = not available

TABLE 43

HunterLab haze readings for products in alcoholic beverages before and after heat treatment (with pH correction)

| Batch | Product | Miller Genuine Draft | | Bacardi Breezer | | Pomtini Cooler | |
|---|---|---|---|---|---|---|---|
| | | haze (%) before heating | haze (%) after heating | haze (%) before heating | haze (%) after heating | haze (%) before heating | haze (%) after heating |
| no protein | | 0.3 | N/A | 25.9 | N/A | N/A | N/A |
| S005-K18-08A | S701 | 20.0 | 18.1 | 33.5 | 25.6 | N/A | N/A |
| S005-K24-08A | S701 | 7.3 | 7.2 | 31.9 | 29.7 | N/A | N/A |

TABLE 43-continued

HunterLab haze readings for products in alcoholic beverages
before and after heat treatment (with pH correction)

| | | Miller Genuine Draft | | Bacardi Breezer | | Pomtini Cooler | |
|---|---|---|---|---|---|---|---|
| Batch | Product | haze (%) before heating | haze (%) after heating | haze (%) before heating | haze (%) after heating | haze (%) before heating | haze (%) after heating |
| S005-L08-08A | S701 | 20.6 | 14.0 | 35.2 | 31.2 | N/A | N/A |
| S005-K19-08A | S300 | 97.0 | 96.3 | 96.7 | 95.6 | N/A | 81.9 |
| | Pro Fam 825 | 96.9 | 96.9 | 96.9 | 97.1 | N/A | 98.7 |
| | Pro Fam 873 | 97.0 | 97.1 | 97.2 | 96.9 | N/A | 99.6 |

N/A = not available

As can be seen from the results of Tables 40 to 43, addition of S701 had little effect on the clarity of the alcoholic beverages. However, beverages containing the commercial soy protein isolates and the S300 were very cloudy. Heat treatment did not reduce the clarity of the alcoholic beverages containing S701, and in many cases slightly improved it. The beverages containing the commercial isolates and the S300 stayed cloudy after heat treatment.

Example 21

This Example contains an evaluation of the content of specific elements in the soy protein isolate produced by the method of Example 12 (S701), soy protein isolate produced by the PMM method of Example 13 (S300) and commercial soy protein isolate Pro Fam 825.

The detection of the elements calcium, phosphorus, magnesium, potassium, sodium, iron, copper, zinc and manganese was performed by plasma emission spectroscopy.

The results obtained are set forth in the following Table 44:

TABLE 44

Content of specific elements in protein products

| | | % dry weight basis | | | | | | ppm | | |
|---|---|---|---|---|---|---|---|---|---|---|
| Batch | Product | Ca | P | Mg | K | Na | Fe | Cu | Zn | Mn |
| S005-K18-08A | S701 | 0.03 | 0.03 | 0.01 | 0.04 | 0.04 | 0.003 | 16 | 8.14 | 1 |
| S005-K24-08A | S701 | 0.08 | 0.04 | 0.01 | 0.02 | 0.04 | 0.004 | 23 | 5.42 | 3 |
| S005-L08-08A | S701 | 0.12 | 0.06 | 0.01 | 0.01 | 0.02 | 0.007 | 22 | 4.76 | 2 |
| S005-K19-08A | S300 | 0.16 | 0.27 | 0.07 | 0.16 | 1.28 | 0.01 | 31 | 37.77 | 35 |
| Pro Fam 825 | | 0.08 | 0.90 | 0.04 | 0.93 | 0.96 | 0.01 | 13 | 47.87 | 10 |

As may be seen from the results of Table 44, the content of the elements of interest was generally lower in the S701 products than in the S300 or the commercial isolate. The S701 products were particularly low in phosphorus, potassium, sodium, zinc and manganese compared to the other isolates.

Example 22

This Example contains an evaluation of the phytic acid content of the soy protein isolate produced by the method of Example 12 (S701), soy protein isolate produced by the PMM method of Example 13 (S300) and commercial soy protein isolates Pro Fam 825 and 873.

Phytic acid content was determined using the method of Latta and Eskin (J. Agric. Food Chem., 28: 1313-1315).

The results obtained are set forth in the following Table 45:

TABLE 45

Phytic acid content of protein products

| Batch | Product | % Phytic acid d.b. |
|---|---|---|
| S005-K18-08A | S701 | 0.00 |
| S005-K24-08A | S701 | 0.02 |
| S005-L08-08A | S701 | 0.00 |
| S005-K19-08A | S300 | 0.62 |
| Pro Fam 825 | | 2.00 |
| Pro Fam 873 | | 1.53 |

As may be seen from the results in Table 45, the S701 samples were extremely low in phytic acid, while the S300 and the commercial isolates contained significant levels of phytic acid.

Example 23

This Example contains an evaluation of the solubility in a reconstituted sports drink (Orange Gatorade powder) of the soy protein isolate produced by the method of Example 12 (S701), soy protein isolate produced by the PMM method of Example 13 (S300) and commercial soy protein isolates Pro Fam 825 and Pro Fam 873. The solubility was determined with the protein and beverage powder dry blended and then dissolved in water with no pH correction and again with the pH of the reconstituted protein/beverage mix adjusted to the level of the powdered beverage reconstituted without protein.

From the preparation instructions on the container of Orange Gatorade powder, it was determined that 6.68 g of powder was required to make 100 ml of the beverage. A sufficient amount of protein powder to provide 2 g of protein was weighed into a 250 ml beaker then Orange Gatorade powder (6.68 g) was added and the mixture dry blended by swirling the beaker. Reverse osmosis (RO) purified water (100 ml) was added to the protein-Gatorade mixture and the sample was stirred slowly on a stir plate for 60 minutes. When the samples were evaluated with pH correction, the pH of the reconstituted Gatorade/protein beverage was adjusted to 3.17 (the pH of reconstituted Orange Gatorade powder without protein) with HCl or NaOH as necessary. The protein content of the samples was analyzed using a LECO FP528 Nitrogen Determinator then an aliquot of the beverages was centrifuged at 7,800 g for 10 minutes and the protein content of the supernatant measured.

Solubility (%)=(% protein in supernatant/% protein in initial dispersion)×100

The results obtained are set forth in the following Table 46:

TABLE 46

Solubility of protein products reconstituted with Orange Gatorade powder

| Batch | Product | no pH correction Solubility (%) | with pH correction Solubility (%) |
| --- | --- | --- | --- |
| BW-S005-K18-08A | S701 | 94.7 | 100 |
| BW-S005-K24-08A | S701 | 97.4 | 100 |
| BW-S005-L08-08A | S701 | 97.9 | 100 |
| BW-S005-K19-08A | S300 | 49.5 | 94.4 |
| Pro-Fam 825 | | 12.9 | 13.1 |
| Pro-Fam 873 | | 14.0 | 12.7 |

As can be seen in the results of Table 46, the S701 products were extremely soluble with the Gatorade powder. The S701 was an acidified product and so had little effect on the pH of the reconstituted beverage. The S300 was not an acidified product and was very soluble only when the pH was corrected. The commercial soy isolates were also not acidified products but were poorly soluble with the Gatorade powder whether or not the pH was corrected.

Example 24

This Example contains an evaluation of the clarity in a reconstituted sports drink (Orange Gatorade powder) of the soy protein isolate produced by the method of Example 12 (S701), soy protein isolate produced by the PMM method of Example 13 (S300) and commercial soy protein isolates Pro Fam 825 and Pro Fam 873. The clarity was determined with the protein and beverage powder dry blended and then dissolved in water with no pH correction and again with the pH of the reconstituted protein/beverage mix adjusted to the level of the powdered beverage reconstituted without protein.

The clarity of the protein dispersions prepared in reconstituted sports drink (Orange Gatorade powder) in Example 23 was assessed using the methods described in Example 15 but with the appropriate beverage used to blank the spectrophotometer for the absorbance measurements at 600 nm.

The results obtained are set forth in the following Table 47:

TABLE 47

Clarity of protein products reconstituted with Orange Gatorade powder

| Batch | Product | no pH correction | | with pH correction | |
| --- | --- | --- | --- | --- | --- |
| | | A600 | haze (%) | A600 | haze (%) |
| no protein | | 0.000 | 31.7 | 0.000 | 31.7 |
| BW-S005-K18-08A | S701 | 0.040 | 32.6 | 0.001 | 32.0 |
| BW-S005-K24-08A | S701 | 0.043 | 33.3 | 0.006 | 33.8 |
| BW-S005-L08-08A | S701 | 0.077 | 37.4 | 0.038 | 37.1 |
| BW-S005-K19-08A | S300 | >3.0 | 94.0 | 1.23 | 83.9 |
| Pro-Fam 825 | | >3.0 | 94.3 | >3.0 | 97.1 |
| Pro-Fam 873 | | >3.0 | 94.4 | >3.0 | 97.3 |

As may be seen by the results of Table 47, the S701 products had little effect on the haze level in the reconstituted Orange Gatorade powder. The reconstituted Orange Gatorade powder with S300 and the commercial isolates was very hazy regardless of whether the pH was corrected.

Example 25

This Example contains an evaluation of the solubility in a reconstituted soft drink (Raspberry Ice Crystal Light powder) of the soy protein isolate produced by the method of Example 12 (S701), soy protein isolate produced by the PMM method of Example 13 (S300) and commercial soy protein isolates Pro Fam 825 and Pro Fam 873. The solubility was determined with the protein and beverage powder dry blended and then dissolved in water with no pH correction and again with the pH of the reconstituted protein/beverage mix adjusted to the level of the powdered beverage reconstituted without protein.

From the preparation instructions on the package of Raspberry Ice Crystal Light powder, it was determined that 0.53 g of powder was required to make 100 ml of the beverage. A sufficient amount of protein powder to provide 2 g of protein was weighed into a 250 ml beaker then Raspberry Ice Crystal Light powder (0.53 g) was added and the mixture dry blended by swirling the beaker. RO water (100 ml) was added to the protein-Crystal Light mixture and the sample was stirred slowly on a stir plate for 60 minutes. When the samples were evaluated with pH correction, the pH of the reconstituted Crystal Light/protein beverage was adjusted to 3.27 (the pH of reconstituted Raspberry Ice Crystal Light powder without protein) with HCl or NaOH as necessary. The protein content of the samples was analyzed using a LECO FP528 Nitrogen Determinator then an aliquot of the beverages was centrifuged at 7,800 g for 10 minutes and the protein content of the supernatant measured.

Solubility (%)=(% protein in supernatant/% protein in initial dispersion)×100

The results obtained are set out in the following Table 48:

TABLE 48

Solubility of protein products reconstituted with Raspberry Ice Crystal Light powder

| Batch | Product | no pH correction Solubility (%) | with pH correction Solubility (%) |
| --- | --- | --- | --- |
| BW-S005-K18-08A | S701 | 100 | 97.2 |
| BW-S005-K24-08A | S701 | 99.0 | 96.0 |
| BW-S005-L08-08A | S701 | 97.9 | 100 |
| BW-S005-K19-08A | S300 | 8.5 | 92.3 |
| Pro-Fam 825 | | 11.9 | 23.3 |
| Pro-Fam 873 | | 14.8 | 19.2 |

As can be seen from the results in Table 48, the S701 products were extremely soluble when reconstituted with the Crystal Light powder. The S701 was an acidified product and so had little effect on the pH of the reconstituted beverage. The S300 was not an acidified product and was very soluble only when the pH was corrected. The commercial soy isolates were not acidified products but were poorly soluble when reconstituted with the Crystal Light powder whether or not the pH was corrected.

Example 26

This Example contains an evaluation of the clarity in a reconstituted soft drink (Raspberry Ice Crystal Light powder) of the soy protein isolate produced by the method of Example 12 (S701), soy protein isolate produced by the PMM method of Example 13 (S300) and commercial soy protein isolates Pro Fam 825 and Pro Fam 873. The clarity was determined with the protein and beverage powder dry blended and then dissolved in water with no pH correction and again with the pH of the reconstituted protein/beverage mix adjusted to the level of the powdered beverage reconstituted without protein.

The clarity of the protein dispersions prepared in reconstituted soft drink (Raspberry Ice Crystal Light powder) in Example 25 was assessed using the methods described in Example 15 but with the appropriate beverage used to blank the spectrophotometer for the absorbance measurements at 600 nm.

The results obtained are set forth in the following Table 49:

TABLE 49

Clarity of protein products reconstituted with Raspberry Ice Crystal Light powder

| Batch | Product | no pH correction | | with pH correction | |
|---|---|---|---|---|---|
| | | A600 | haze (%) | A600 | haze (%) |
| no protein | | 0.000 | 0.3 | 0.000 | 0.3 |
| BW-S005-K18-08A | S701 | 0.003 | 0.5 | 0.000 | 2.8 |
| BW-S005-K24-08A | S701 | 0.000 | 0.7 | 0.000 | 2.8 |
| BW-S005-L08-08A | S701 | 0.026 | 4.6 | 0.000 | 4.7 |
| BW-S005-K19-08A | S300 | >3.0 | 100.1 | 1.296 | 81.7 |
| Pro-Fam 825 | | >3.0 | 95.8 | >3.0 | 97.4 |
| Pro-Fam 873 | | >3.0 | 96.9 | >3.0 | 98.7 |

As may be seen by the results of Table 49, the S701 products had little effect on the clarity of the reconstituted Raspberry Ice Crystal Light. The reconstituted Raspberry Ice Crystal Light with S300 and the commercial isolates were very hazy regardless of whether the pH was corrected.

Example 27

This Example describes the production of novel soy protein products having a protein content of less than 90% by weight (N×6.25) d.b. in accordance with one embodiment of the invention.

'a' kg of defatted, minimally heat processed soy flour was added to 'b' L of 'c' M CaCl$_2$ solution at ambient temperature and agitated for 30 minutes to provide an aqueous protein solution. The residual soy flour was removed and the resulting protein solution was partially clarified by centrifugation to produce 'd' L of partially clarified protein solution having a protein content of 'e' % by weight. The partially clarified protein solution was diluted with 1 volume of water and adjusted to pH 3 with HCl.

The diluted and acidified protein solution was further clarified by filtration, providing 'f' L of solution having a protein content of 'g' by weight.

The 'h' L of protein solution was reduced in volume to 'i' L by concentration on a polyvinylidene fluoride (PVDF) membrane having a molecular weight cutoff of 'j' Daltons. At volume reduction factors (VRF) 5, 7, and 10, 200 ml samples of the retentate were taken and freeze dried.

The parameters 'a' to 'j' are set forth in the following Table 50:

TABLE 50

| a | 20 |
|---|---|
| b | 200 |
| c | 0.15 |
| d | 138 |
| e | 2.57 |
| f | 304 |
| g | 1.20 |
| h | 304 |
| i | 28 |
| j | 5,000 |

Dried samples were analyzed for protein content using a Leco FP 528 Nitrogen Determinator and moisture content using an oven drying method. Samples of the soy protein products, sufficient to supply 0.48 g of protein, were then dissolved in water (15 ml) and the pH adjusted to 3 as necessary. The colour and clarity of the solutions was measured using a HunterLab ColorQuest XE instrument. The results obtained are set forth in Table 51 below.

TABLE 51

Protein content of dry products and colour and haze readings for solutions of soy protein product in water

| | % protein | Colour Analysis | | | |
|---|---|---|---|---|---|
| | (N × 6.25) d.b. | L* | a* | b* | Haze (%) |
| VRF 5 | 73.0% | 94.88 | −1.54 | 13.31 | 6.6% |
| VRF 7 | 78.1% | 94.43 | −1.55 | 14.31 | 5.1% |
| VRF 10 | 82.4% | 94.29 | −1.50 | 14.50 | 7.0% |

As can be seen from the results in Table 51, the partially purified soy protein products gave solutions of acceptable colour and very good clarity when solubilized in water at pH 3.

Example 28

This Example describes the production of a novel soy protein product having a protein content of less than 90% by weight (N×6.25) d.b. in accordance with one embodiment of the invention.

'a' g of defatted, minimally heat processed soy flour was added to 'b' ml of 'c' M CaCl$_2$ solution at ambient temperature and agitated for 30 minutes to provide an aqueous protein solution. The residual soy flour was removed and the resulting protein solution was clarified by centrifugation and filtration to produce 'd' ml of clarified protein solution having a protein content of 'e' % by weight.

An 'f' ml aliquot of filtrate was diluted with 1 volume of water and adjusted to pH 3 with HCl. The resulting 'g' ml solution having a protein content of 'h' % by weight was then concentrated on a PES membrane having a molecular weight cutoff of 'i' Daltons. At volume reduction factors of 1.25, 2 and at the final concentration point, samples of the retentate were taken and freeze dried. Another sample of retentate was also taken after 2 volumes of diafiltration (DF) with water and freeze dried.

The parameters 'a' to 'i' for the run are set forth in the following Table 52:

TABLE 52

| | |
|---|---|
| a | 100 |
| b | 1,000 |
| c | 0.15 |
| d | 800 |
| e | 2.91 |
| f | 500 |
| g | 1,000 |
| h | 1.20 |
| i | 10,000 |

Dried samples were analyzed for protein content using a Leco FP 528 Nitrogen Determinator and moisture content using an oven drying method. Samples of the soy protein products, sufficient to supply 0.48 g of protein, were then dissolved in water (15 ml) and the pH adjusted to 3 as necessary. The colour and clarity of the solutions was measured using a HunterLab ColorQuest XE instrument. The results obtained are set forth in Table 53 below:

TABLE 53

Protein content of dry products and colour and haze readings for solutions of soy protein product in water

| | % protein | Colour Analysis | | | |
|---|---|---|---|---|---|
| | (N × 6.25) d.b. | L* | a* | b* | Haze (%) |
| VRF 1.25 | 50.6% | 98.58 | −1.66 | 6.90 | 0.0 |
| VRF 2 | 57.7% | 98.46 | −1.66 | 7.19 | 0.0 |
| end retentate before DF | 81.6% | 98.28 | −1.59 | 7.65 | 0.0 |
| end retentate after DF (2 vol.) | 90.4% | 98.42 | −1.45 | 6.96 | 0.0 |

As can be seen from the results in Table 53, the partially purified soy protein products gave solutions of very good colour and clarity when solubilized in water at pH 3.

Example 29

This Example illustrates the effect of membrane type and pore size on the trypsin inhibitor activity of the novel, acid soluble soy protein isolate (S701) provided herein.

Protein content determinations were performed using a Leco FP528 Nitrogen Determinator. Trypsin inhibitor activity was determined using the method of Kakade et al. Cereal Chem., 51:376-381 (1974), modified to initially solubilize the sample in water.

'a' kg of defatted, minimally heat processed soy flour was added to 'b' L of 0.15 M $CaCl_2$ solution at ambient temperature and agitated for 30 minutes to provide an aqueous protein solution. The residual soy meal was removed and the resulting protein solution was clarified by centrifugation and filtration to produce 'c' L of filtered protein solution having a protein content of 'd' % by weight.

The filtered protein solution was then added to 'e' volume(s) of reverse osmosis purified water and the pH of the sample lowered to 3.01 with diluted HCl. The diluted and acidified filtrate was not heat treated.

The diluted and acidified protein extract solution was reduced in volume from 'f' L to 'g' L by concentration on a 'h' membrane, having a molecular weight cutoff of 'i' Daltons, operated at a temperature of approximately 'j' ° C. The acidified protein solution, with a protein content of 'k' wt %, was diafiltered with 'l' L of reverse osmosis purified water, with the diafiltration operation conducted at approximately 'm' ° C. The resulting diafiltered protein solution was then further concentrated to provide a solution with a protein content of 'n' % by weight which represented a yield of 'o' wt % of the initial filtered protein solution. The acidified, diafiltered, concentrated protein solution was then dried to yield a product found to have a protein content of 'p' wt % (N×6.25) d.b. and a phytic acid content of 'q' wt % d.b. The dry product was found to have a trypsin inhibitor activity of 'r' trypsin inhibitor units/mg protein (N×6.25). The product was given designation 's' S701.

The parameters 'a' to 's' for two runs are set forth in the following Table 54:

TABLE 54

Parameters for the runs to produce S701 in this Example

| s | S008-D01-09A | S008-D02-09A |
|---|---|---|
| a | 60 | 60 |
| b | 600 | 600 |
| c | 420 | 450 |
| d | 2.41 | 2.87 |
| e | 1 | 1 |
| f | 840 | 900 |
| g | 136 | 180 |
| h | PES | PES |
| i | 100,000 | 10,000 |
| j | 30 | 30 |
| k | 7.55 | 5.93 |
| l | 400 | 600 |
| m | 31 | 30 |
| n | 15.28 | 15.13 |
| o | 82.3 | 73.5 |
| p | 100.74 | 100.17 |
| q | 0.00 | 0.00 |
| r | 82 | 120 |

As can be seen from the data in Table 54, the isolate produced using the membrane with the larger pore size had a lower trypsin inhibitor activity.

When the S701 isolate samples were dissolved in water, the resulting low pH solutions were transparent and very light in colour as may be seen from the results set forth in the following Table 54A:

TABLE 54A pH, colour and haze readings for solutions of S701 in water

| Sample | pH | L* | a* | b* | haze (%) |
|---|---|---|---|---|---|
| S008-D01-09A S701 | 3.23 | 95.44 | −0.37 | 8.75 | 9.4 |
| S008-D02-08A S701 | 3.16 | 95.38 | −0.36 | 8.79 | 10.8 |

Example 30

This Example illustrates the effectiveness of concentration and diafiltration steps in lowering the trypsin inhibitor activity.

'a' kg of defatted, minimally heat processed soy flour was added to 'b' L of 0.15 M $CaCl_2$ solution at ambient temperature and agitated for 30 minutes to provide an aqueous protein solution. The residual soy meal was removed and the resulting protein solution was clarified by centrifugation and filtration to produce 'c' L of filtered protein solution having a protein content of 'd' % by weight.

The filtered protein solution was then added to 'e' volume(s) of reverse osmosis purified water and the pH of the sample lowered to 'f' with diluted HCl. The diluted and acidified solution was then heat treated at 90° C. for 1 minute.

The diluted, acidified and heat treated protein extract solution was reduced in volume from 'g' L to 'h' L by concentration on a 'i' membrane, having a molecular weight cutoff of 'j' Daltons, operated at a temperature of approximately 'k' ° C. At this point the acidified protein solution, with a protein content 'l' wt %, was diafiltered with 'm' L of reverse osmosis (RO) purified water, with the diafiltration operation conducted at approximately 'n' ° C. The diafiltered solution was then concentrated to a volume of 'o' L and diafiltered with an additional 'p' L of RO water, with the diafiltration operation conducted at approximately 'q' ° C. After this second diafiltration, the protein solution was concentrated from a protein content of 'r' % by weight to a protein content of approximately 's' % by weight then diluted to a protein content of 't' % by weight with water to facilitate spray drying. The protein solution before spray drying was recovered in a yield of 'u' wt % of the initial filtered protein solution. The acidified, diafiltered, concentrated protein solution was then dried to yield a product found to have a protein content of 'v' wt % (N×6.25) d.b. and a phytic acid content of 'w' wt % d.b. The dry product was found to have a trypsin inhibitor activity of 'x' trypsin inhibitor units (TIU)/mg protein (N×6.25). The product was given designation 'y' S701H.

The parameters 'a' to 'y' for three runs are set forth in the following Table 55:

TABLE 55

Parameters for the runs to produce S701H

| y | S010-G20-09A | S010-G22-09A | S010-G29-09A |
|---|---|---|---|
| a | 22.68 | 22.68 | 22.68 |
| b | 300 | 300 | 300 |
| c | 280 | 290 | 289 |
| d | 1.54 | 1.64 | 1.47 |
| e | 1 | 1 | 1 |
| f | 3.07 | 3.07 | 2.92 |
| g | 560 | 580 | 580 |
| h | 99 | 92 | 93 |
| i | PES | PVDF | PES |
| j | 100,000 | 100,000 | 100,000 |
| k | 30 | 30 | 31 |
| l | 4.20 | 4.42 | 4.44 |
| m | 100 | 100 | 100 |
| n | 31 | 30 | 30 |
| o | 49 | 39 | 46 |
| p | 300 | 300 | 300 |
| q | 31 | 30 | 30 |
| r | 6.92 | 7.54 | 8.75 |
| s | 16 | 16 | 18 |
| t | 6.90 | 6.92 | 8.39 |
| u | 83.3 | 76.1 | 84.5 |
| v | 100.80 | 99.41 | 101.56 |
| w | 0.05 | 0.05 | 0.06 |
| x | 18.2 | 18.9 | 17.4 |

Table 56 shows the reduction in trypsin inhibitor activity of the protein solution at various points in the process.

TABLE 56

Trypsin inhibitor activity at various points in the process (TIU/mg protein (N × 6.25))

| sample | S010-G20-09A | S010-G22-09A | S010-G29-09A |
|---|---|---|---|
| after heat treatment | 72.5 | 79.8 | 101.9 |
| concentrated solution before 1st DF | 61.0 | 73.8 | 47.3 |
| concentrated solution after 1st DF | 48.5 | 50.3 | 42.0 |
| solution after 2nd DF | 30.5 | 35.2 | 24.9 |
| after dilution for spray drying | 24.8 | 30.9 | 22.7 |

As may be seen from the results in Table 56, reductions in trypsin inhibitor activity were achieved at all points in the concentration and diafiltration process.

When the S701H isolate samples were dissolved in water, the resulting low pH solutions were transparent and very light in colour as may be seen from the results set forth in the following Table 56A:

TABLE 56A pH, colour and haze readings for solutions of S701H in water

| Sample | pH | L* | a* | b* | haze (%) |
|---|---|---|---|---|---|
| S010-G20-09A S701H | 3.33 | 95.80 | −0.35 | 7.58 | 6.9 |
| S010-G22-09A S701H | 3.37 | 96.82 | −0.45 | 6.84 | 2.4 |
| S010-G29-09A S701H | 3.45 | 96.55 | −0.52 | 7.21 | 4.2 |

Example 31

This Example illustrates a reduction in the trypsin inhibitor activity level resulting from the inclusion of the optional dilution step. Use of the dilution step results in greater membrane processing and is in essence resulting in extra diafiltration.

'a' kg of defatted, minimally heat processed soy flour was added to 'b' L of 0.15 M $CaCl_2$ solution at ambient temperature and agitated for 30 minutes to provide an aqueous protein solution. The residual soy meal was removed and the resulting protein solution was clarified by centrifugation to produce 'c' L of clarified protein solution having a protein content of 'd' % by weight.

The clarified protein solution was then added to 'e' volume(s) of reverse osmosis purified water and the pH of the sample 'f'. The sample was then polished by filtration, providing 'g' L of filtered protein solution with a protein content of 'h' % by weight. The pH of the sample 'i'. The filtrate was not heat treated.

The filtered protein extract solution was reduced in volume from 'j' L to 'k' L by concentration on a 'l' membrane, having a molecular weight cutoff of 'm' Daltons, operated at a temperature of approximately 'n' ° C. The concentrated, acidified protein solution was diafiltered with 'o' L of reverse osmosis purified water, with the diafiltration operation conducted at approximately 'p' ° C. The resulting acidified, diafiltered, concentrated protein solution had a protein content of 'q' % by weight and represented a yield of 'r' wt % of the initial clarified protein solution. The acidified, diafiltered, concentrated protein solution was then dried to yield a product found to have a protein content of 's' wt % (N×6.25) d.b. and a phytic acid content of 't' wt % d.b. The dry product was found to have a trypsin inhibitor activity of 'u' trypsin inhibitor units/mg protein (N×6.25). The product was given designation 'v' S701.

The parameters 'a' to 'v' for three runs are set forth in the following Table 57:

TABLE 57

Parameters for the runs to produce S701

| v | S005-A08-09A | S005-A15-09A | S005-A27-09A |
|---|---|---|---|
| a | 20 | 20 | 20 |
| b | 200 | 200 | 200 |
| c | 138 | 147 | 159 |
| d | 2.57 | 2.54 | 2.61 |
| e | 1 | 1 | 0 |
| f | lowered to 3.00 with diluted HCl | lowered to 2.91 with diluted $H_3PO_4$ | was not changed |
| g | 311 | 325 | 205 |
| h | 1.2 | 0.88 | 2.09 |
| i | was not changed | was not changed | was lowered to 3.07 with diluted HCl |
| j | 304 | 325 | 205 |
| k | 28 | 28 | 25 |
| l | PVDF | PVDF | PVDF |
| m | 5,000 | 5,000 | 5,000 |
| n | 30 | 28 | 30 |
| o | 140 | 140 | 125 |
| p | 30 | 29 | 30 |
| q | 10.03 | 12.87 | 12.04 |
| r | 79.4 | 59.0 | 76.4 |
| s | 100.87 | 102.60 | 102.26 |
| t | 0.34 | ND | 0.11 |
| u | 66 | 57 | 90 |

As can be seen from the results presented in Table 57, the runs with a dilution step generated product with a lower trypsin inhibitor activity than the run where no dilution step was employed.

When the S701 isolate samples were dissolved in water, the resulting low pH solutions were transparent and very light in colour as may be seen from the results set forth in the following Table 57A:

TABLE 57A pH, colour and haze readings for solutions of S701 in water

| Sample | pH | L* | a* | b* | haze (%) |
|---|---|---|---|---|---|
| S005-A08-09A S701 | 3.15 | 95.44 | −0.68 | 10.47 | 4.4 |
| S005-A15-09A S701 | 3.32 | 95.45 | −0.74 | 10.54 | 2.5 |
| S005-A27-09A S701 | 3.07 | 96.19 | −1.35 | 11.60 | 3.8 |

Example 32

This Example illustrates the effect of the temperature of membrane processing on the trypsin inhibitor activity of the novel, acid soluble soy protein isolate (S701H) provided herein.

'a' kg of defatted, minimally heat processed soy flour was added to 'b' L of 0.15 M $CaCl_2$ solution at ambient temperature and agitated for 30 minutes to provide an aqueous protein solution. The residual soy meal was removed and the resulting protein solution was clarified by centrifugation and filtration to produce 'c' L of filtered protein solution having a protein content of 'd' % by weight.

The filtered protein solution was then added to 'e' volume(s) of reverse osmosis purified water and the pH of the sample lowered to 'f' with diluted HCl. The diluted and acidified solution was then heat treated at 90° C. for 1 minute.

The diluted, acidified and heat treated protein extract solution was reduced in volume from 'g' L to 'h' L by concentration on a 'i' membrane, having a molecular weight cutoff of 'j' Daltons, operated at a temperature of approximately 'k' ° C. At this point the acidified protein solution, with a protein content of 'l' % wt, was diafiltered with 'm' L of reverse osmosis (RO) purified water, with the diafiltration operation conducted at approximately 'n' ° C. The diafiltered solution was then further concentrated to a volume of 'o' L and diafiltered with an additional 'p' L of RO water, with the diafiltration operation conducted at approximately 'q' ° C. After this second diafiltration, the protein solution was concentrated from a protein content of 'r' % by weight to a protein content of approximately 's' % by weight then diluted to a protein content of 't' % by weight with water to facilitate spray drying. The protein solution before spray drying was recovered in a yield of 'u' wt % of the initial filtered protein solution. The acidified, diafiltered, concentrated protein solution was then dried to yield a product found to have a protein content of 'v' wt % (N×6.25) d.b. and a phytic acid content of 'w' wt % d.b. The dry product was found to have a trypsin inhibitor activity of 'x' trypsin inhibitor units (TIU)/mg protein (N×6.25). The product was given designation 'y' S701H.

The parameters 'a' to 'y' for two runs are set forth in the following Table 58:

TABLE 58

Parameters for the runs to produce S701H

| y | S010-G06-09A | S010-G14-09A |
|---|---|---|
| a | 22.5 | 22.68 |
| b | 300 | 300 |
| c | 290 | 280 |
| d | 1.45 | 1.71 |
| e | 1 | 1 |
| f | 2.90 | 3.00 |
| g | 580 | 560 |
| h | 85 | 85 |
| i | PES | PES |
| j | 100,000 | 100,000 |
| k | 49 | 30 |
| l | 4.39 | 4.71 |
| m | 100 | 100 |
| n | 50 | 30 |
| o | 42 | 42 |
| p | 300 | 300 |
| q | 51 | 30 |
| r | 8.29 | 7.61 |
| s | N/A | 17 |
| t | 6.94 | 7.48 |
| u | 78.1 | 70.8 |
| v | 102.61 | 100.01 |
| w | 0.00 | 0.02 |
| x | 15.3 | 35.2 |

N/A = not available

As may be seen from the results in Table 58, the run conducted with membrane processing at about 50° C. had a lower trypsin inhibitor activity than the run with membrane processing conducted at about 30° C.

When the S701H isolate samples were dissolved in water, the resulting low pH solutions were transparent and very light in colour as may be seen from the results set forth in the following Table 58A:

TABLE 58A pH, colour and haze readings for solutions of S701H in water

| Sample | pH | L* | a* | b* | haze (%) |
|---|---|---|---|---|---|
| S010-G06-09A S701H | 3.28 | 96.11 | −0.22 | 6.19 | 8.9 |
| S010-G14-09A S701H | 3.42 | 96.50 | −0.54 | 7.27 | 4.5 |

Example 33

This Example illustrates the effect of a heat treatment on the trypsin inhibitor activity of the novel, acid soluble soy protein isolate (S701 and S701H).

'a' kg of defatted, minimally heat processed soy flour was added to 'b' L of 0.15 M $CaCl_2$ solution at ambient temperature and agitated for 30 minutes to provide an aqueous protein solution. The residual soy meal was removed and the resulting protein solution was clarified by centrifugation to produce 'c' L of clarified protein solution having a protein content of 'd' % by weight.

The clarified protein solution was then added to 'e' volume(s) of reverse osmosis purified water and the pH of the sample lowered to 'f' with diluted HCl. The sample was heat treated at 'g' ° C. for 'h' minutes and then polished by filtration, providing 'i' L of filtered protein solution with a protein content of 'j' % by weight.

The filtered protein extract solution was reduced in volume from 'k' L to 'l' L by concentration on a 'm' membrane, having a molecular weight cutoff of 'n' Daltons, operated at a temperature of approximately 'o' ° C. The concentrated, acidified protein solution was diafiltered with 'p' L of reverse osmosis purified water, with the diafiltration operation conducted at approximately 'q' ° C. The resulting acidified, diafiltered, concentrated protein solution had a protein content of 'r' % by weight and represented a yield of 's' wt % of the initial clarified protein solution. The acidified, diafiltered, concentrated protein solution was then dried to yield a product found to have a protein content of 't' wt % (N×6.25) d.b. and a phytic acid content of 'u' wt % d.b. The dry product was found to have a trypsin inhibitor activity of 'v' trypsin inhibitor units/mg protein (N×6.25). The product was given designation 'w'.

The parameters 'a' to 'w' for two runs are set forth in the following Table 59:

TABLE 59

| Parameters for the runs to produce S701 and S701H | | |
|---|---|---|
| w | S005-L09-08A S701H | S005-A08-09A S701 |
| a | 20 | 20 |
| b | 200 | 200 |
| c | 142.1 | 138 |
| d | 3.07 | 2.57 |
| e | 1 | 1 |
| f | 3.14 | 3.00 |
| g | 75 | — |
| h | 10 | — |
| i | 280 | 311 |
| j | 1.23 | 1.20 |
| k | 280 | 304 |
| l | 25 | 28 |
| m | PVDF | PVDF |
| n | 5,000 | 5,000 |
| o | 30 | 30 |
| p | 125 | 140 |
| q | 28 | 30 |
| r | 11.74 | 10.03 |
| s | 84.0 | 79.4 |
| t | 102.66 | 100.87 |
| u | 0.17 | 0.34 |
| v | 40.5 | 66 |

As may be seen from the results in Table 59, the isolate prepared by the process that included a heat treatment step had a lower trypsin inhibitor activity.

When the S701 and S701H isolate samples were dissolved in water, the resulting low pH solutions were transparent and very light in colour as may be seen from the results set forth in the following Table 59A:

TABLE 59A

| pH, colour and haze readings for solutions of S701 and S701H in water | | | | | |
|---|---|---|---|---|---|
| Sample | pH | L* | a* | b* | haze (%) |
| S005-A08-09A S701 | 3.15 | 95.44 | −0.68 | 10.47 | 4.4 |
| S005-L09-08A S701H | 3.03 | 95.49 | −0.70 | 12.10 | 3.0 |

Example 34

This Example also illustrates the effect of a heat treatment on the trypsin inhibitor activity of the novel, acid soluble soy protein isolate (S701 and S701H) provided herein.

'a' kg of defatted, minimally heat processed soy flour was added to 'b' L of 0.15 M $CaCl_2$ solution at ambient temperature and agitated for 30 minutes to provide an aqueous protein solution. The residual soy meal was removed and the resulting protein solution was clarified by centrifugation and filtration to produce 'c' L of filtered protein solution having a protein content of 'd' % by weight.

The filtered protein solution was then added to 'e' volume(s) of reverse osmosis purified water and the pH of the sample lowered to 'f' with diluted HCl. The diluted and acidified solution was then heat treated at 'g' ° C. for 'h' minute(s).

The protein extract solution was reduced in volume from 'i' L to 'j' L by concentration on a 'k' membrane, having a molecular weight cutoff of 'l' Daltons, operated at a temperature of approximately 'm' ° C. At this point the acidified protein solution, with a protein content of 'n' wt %, was diafiltered with 'o' L of reverse osmosis (RO) purified water, with the diafiltration operation conducted at approximately 'p' ° C. The diafiltered solution was then further concentrated to a volume of 'q' L and diafiltered with an additional 'r' L of RO water, with the diafiltration operation conducted at approximately 's' ° C. After this second diafiltration, the protein solution was concentrated from a protein content of 't' % by weight to a protein content of approximately 'u' % by weight then diluted to a protein content of 'v' % by weight with water to facilitate spray drying. The protein solution before spray drying was recovered in a yield of 'w' wt % of the initial filtered protein solution. The acidified, diafiltered, concentrated protein solution was then dried to yield a product found to have a protein content of 'x' wt % (N×6.25) d.b. and a phytic acid content of 'y' wt % d.b. The dry product was found to have a trypsin inhibitor activity of 'z' trypsin inhibitor units (TIU)/mg protein (N×6.25). The product was given designation 'aa'.

The parameters 'a' to 'aa' for two runs are set forth in the following Table 60:

TABLE 60

| Parameters for the runs to produce S701 and S701H | | |
|---|---|---|
| aa | S010-G06-09A S701H | S010-G13-09A S701 |
| a | 22.5 | 22.68 |
| b | 300 | 300 |
| c | 290 | 275 |
| d | 1.45 | 1.63 |
| e | 1 | 1 |
| f | 2.90 | 2.89 |
| g | 90 | — |
| h | 1 | — |
| i | 580 | 560 |
| j | 85 | 85 |

TABLE 60-continued

Parameters for the runs to produce S701 and S701H

| aa | S010-G06-09A S701H | S010-G13-09A S701 |
|---|---|---|
| k | PES | PES |
| l | 100,000 | 100,000 |
| m | 49 | 50 |
| n | 4.39 | 4.37 |
| o | 100 | 100 |
| p | 50 | 50 |
| q | 42 | 42 |
| r | 300 | 300 |
| s | 51 | 51 |
| t | 8.29 | 7.61 |
| u | N/A | 14 |
| v | 6.94 | 6.90 |
| w | 78.1 | 69.2 |
| x | 102.61 | 100.54 |
| y | 0.00 | 0.04 |
| z | 15.3 | 26.5 |

N/A = not available

As may be seen from the results in Table 60, the isolate prepared by the process that included a heat treatment step had a lower trypsin inhibitor activity.

When the S701 and S701H isolate samples were dissolved in water, the resulting low pH solutions were transparent and very light in colour as may be seen from the results set forth in the following Table 60A.

TABLE 60A pH, colour and haze readings for solutions of S701 and S701H in water

| Sample | pH | L* | a* | b* | haze (%) |
|---|---|---|---|---|---|
| S010-G06-09A S701H | 3.28 | 96.11 | −0.22 | 6.19 | 8.9 |
| S010-G13-09A S701 | 3.42 | 95.43 | −0.02 | 6.74 | 9.3 |

Example 35

This Example illustrates the effect of using soy protein sources exposed to different levels of heat treatment on the trypsin inhibitor activity of the novel, acid soluble soy protein isolate (S701) provided herein.

'a' kg of defatted, minimally heat processed soy flour (S005), defatted, moderately heat treated soy flour (S007) or defatted, fully heat treated soy flour (S006) was added to 'b' L of 0.15 M $CaCl_2$ solution at ambient temperature and agitated for 30 minutes to provide an aqueous protein solution. The residual soy meal was removed and the resulting protein solution was clarified by centrifugation to produce 'c' L of clarified protein solution having a protein content of 'd' % by weight.

The clarified protein solution was then added to 'e' volume(s) of reverse osmosis purified water and the pH of the sample lowered to 'f' with diluted 'g'. The sample was then polished by filtration, providing 'h' L of filtered protein solution with a protein content of 'i' % by weight. The filtrate was not heat treated.

The filtered protein extract solution was reduced in volume from 'j' L to 'k' L by concentration on a 'l' membrane, having a molecular weight cutoff of 'm' Daltons, operated at a temperature of approximately 'n' °C. The concentrated, acidified protein solution was diafiltered with 'o' L of reverse osmosis purified water, with the diafiltration operation conducted at approximately 'p' °C. The resulting acidified, diafiltered, concentrated protein solution had a protein content of 'q' % by weight and represented a yield of 'r' wt % of the initial clarified protein solution. The acidified, diafiltered, concentrated protein solution was then dried to yield a product found to have a protein content of 's' wt % (N×6.25) d.b. and a phytic acid content of 't' wt % d.b. The dry product was found to have a trypsin inhibitor activity of 'u' trypsin inhibitor units/mg protein (N×6.25). The product was given designation 'v' S701.

The parameters 'a' to 'v' for three runs are set forth in the following Table 61:

TABLE 61

Parameters for the runs to produce S701

| v | S005-A15-09A | S007-A26-09A | S006-A21-09A |
|---|---|---|---|
| a | 20 | 20 | 20 |
| b | 200 | 200 | 200 |
| c | 147 | 169 | 175 |
| d | 2.54 | 1.50 | 1.00 |
| e | 1 | 1 | 1 |
| f | 2.91 | 3.00 | 2.86 |
| g | $H_3PO_4$ | HCl | HCl |
| h | 325 | 390 | 414 |
| i | 0.88 | 0.66 | 0.33 |
| j | 325 | 390 | 414 |
| k | 28 | 25 | 27 |
| l | PVDF | PVDF | PVDF |
| m | 5,000 | 5,000 | 5,000 |
| n | 28 | 30 | 30 |
| o | 140 | 125 | 135 |
| p | 29 | 28 | 29 |
| q | 12.87 | 9.54 | 4.59 |
| r | 59.0 | 73.2 | 48.0 |
| s | 102.60 | 101.07 | 97.25 |
| t | N.D. | 0.20 | 0.00 |
| u | 57 | 40.5 | 12 |

N.D. = not determined

As can be seen from the data presented in Table 61, the greater the heat treatment of the soy protein source, the lower the trypsin inhibitor activity in the final isolate.

When the S701 isolate samples were dissolved in water, the resulting low pH solutions were transparent and very light in colour as may be seen from the results set forth in the following Table 61A.

TABLE 61A pH, colour and haze readings for solutions of S701 in water

| Sample | pH | L* | a* | b* | haze (%) |
|---|---|---|---|---|---|
| S005-A15-09A S701 | 3.32 | 95.45 | −0.74 | 10.54 | 2.5 |
| S007-A26-09A S701 | 3.14 | 95.90 | −0.29 | 7.27 | 9.1 |
| S006-A21-09A S701 | 3.31 | 93.82 | 0.32 | 10.82 | 8.9 |

Example 36

This Example illustrates the effect of sodium sulfite addition with the soy protein source on the trypsin inhibitor activity of the novel, acid soluble soy protein isolate (S701H) provided herein.

'a' kg of defatted, minimally heat processed soy flour was added to 'b' L of 0.15 M $CaCl_2$ solution at ambient temperature and agitated for 20 minutes. 'c' kg of sodium sulfite was then added and the mixture agitated for an additional 10 minutes to provide an aqueous protein solution. The residual soy meal was removed and the resulting protein solution was clarified by centrifugation and filtration to produce 'd' L of filtered protein solution having a protein content of 'e' % by weight.

The filtered protein solution was then added to 'f' volume(s) of reverse osmosis (RO) purified water and the pH of the sample lowered to 'g' with diluted HCl. The diluted and acidified solution was then heat treated at 90° C. for 1 minute.

The diluted, acidified and heat treated protein extract solution was reduced in volume from 'h' L to 'i' L by concentration on a 'j' membrane, having a molecular weight cutoff of 'k' Daltons, operated at a temperature of approximately 'l' ° C. At this point the acidified protein solution, with protein content 'm' wt % was diafiltered with 'n' L of RO water, with the diafiltration operation conducted at approximately 'o' ° C. The diafiltered solution was then further concentrated to a volume of 'p' L and diafiltered with an additional 'q' L of RO water, with the diafiltration operation conducted at approximately 'r' ° C. After this second diafiltration, the protein solution was concentrated from a protein content of 's' % by weight to a protein content of approximately 't' % by weight then diluted to a protein content of 'u' % by weight with water to facilitate spray drying. The protein solution before spray drying was recovered in a yield of 'v' wt % of the initial filtered protein solution. The acidified, diafiltered, concentrated protein solution was then dried to yield a product found to have a protein content of 'w' wt % (N×6.25) d.b. and a phytic acid content of 'x' wt % d.b. The dry product was found to have a trypsin inhibitor activity of 'y' trypsin inhibitor units (TIU)/mg protein (N×6.25). The product was given designation 'z' S701H.

The parameters 'a' to 'z' for two runs are set forth in the following Table 62:

TABLE 62

Parameters for the runs to produce S701H

| z | S010-G21-09A | S010-G28-09A |
|---|---|---|
| a | 22.5 | 22.68 |
| b | 300 | 300 |
| c | 0.6 | 0 |
| d | 280 | 270.4 |
| e | 1.89 | 1.95 |
| f | 1 | 1 |
| g | 2.98 | 2.96 |
| h | 560 | 535 |
| i | 92 | 98 |
| j | PES | PES |
| k | 100,000 | 100,000 |
| l | 31 | 30 |
| m | 5.15 | 3.74 |
| n | 100 | 100 |
| o | 31 | 30 |
| p | 46 | 49 |
| q | 300 | 300 |
| r | 30 | 30 |
| s | 8.18 | 6.93 |
| t | 17 | 15 |
| u | 7.45 | 7.16 |
| v | 75.6 | 59.4 |
| w | 100.67 | 100.44 |
| x | 0.00 | 0.48 |
| y | 7.5 | 27.7 |

As can be seen from the results of Table 62, the process employing the added sodium sulfite yielded an isolate with a lower trypsin inhibitor activity.

When the S701H isolate samples were dissolved in water, the resulting low pH solutions were transparent and very light in colour as may be seen from the results set forth in the following Table 62A.

TABLE 62A pH, colour and haze readings for solutions of S701H in water

| Sample | pH | L* | a* | b* | haze (%) |
|---|---|---|---|---|---|
| S010-G21-09A S701H | 3.36 | 97.28 | −0.39 | 4.58 | 5.4 |
| S010-G28-09A S701H | 3.41 | 96.05 | −0.44 | 7.70 | 5.2 |

Example 37

This Example illustrates the effect of sodium sulfite addition to the diafiltered concentrated protein solution before drying on the trypsin inhibitor activity of the novel, acid soluble soy protein isolate (S701H) provided herein.

'a' kg of defatted, minimally heat processed soy flour was added to 'b' L of 0.15 M $CaCl_2$ solution at ambient temperature and agitated for 30 minutes to provide an aqueous protein solution. The residual soy meal was removed and the resulting protein solution was clarified by centrifugation and filtration to produce 'c' L of filtered protein solution having a protein content of 'd' % by weight.

The filtered protein solution was then added to 'e' volume(s) of reverse osmosis (RO) purified water and the pH of the sample lowered to 'f' with diluted HCl. The diluted and acidified solution was then heat treated at 90° C. for 1 minute.

The diluted, acidified and heat treated protein extract solution was reduced in volume from 'g' L to 'h' L by concentration on a 'i' membrane, having a molecular weight cutoff of 'j' Daltons, operated at a temperature of approximately 'k' ° C. At this point the acidified protein solution, with a protein content of 'l' wt % was diafiltered with 'm' L of RO water, with the diafiltration operation conducted at approximately 'n' ° C. The diafiltered solution was then further concentrated to a volume of 'o' L and diafiltered with an additional 'p' L of RO water, with the diafiltration operation conducted at approximately 'q' ° C. After this second diafiltration, the protein solution was concentrated from a protein content of 'r' % by weight to a protein content of approximately 's' % by weight then diluted to a protein content of 't' % by weight with water to facilitate spray drying. The protein solution before spray drying was recovered in a yield of 'u' wt % of the initial filtered protein solution. The acidified, diafiltered, concentrated protein solution was then split in two portions. The control portion (25.1 kg) was dried to yield a product found to have a protein content of 'v' wt % (N×6.25) d.b., a phytic acid content of 'w' wt % d.b. and a trypsin inhibitor activity of 'x' trypsin inhibitor units (TIU)/mg protein (N×6.25). The product was given designation 'y' S701H-01. To the other portion of the acidified, diafiltered concentrated protein solution (25.1 kg) was added 'z' mg of sodium sulfite. This sample was then dried to yield a product found to have a protein content of 'aa' wt % (N×6.25) d.b., a phytic acid content of "ab" wt % d.b. and a trypsin inhibitor activity of 'ac' trypsin inhibitor units (TIU)/mg protein (N×6.25). The product was given designation 'y' S701H-02.

The parameters 'a' to 'ac' for one run are set forth in the following Table 63:

TABLE 63

Parameters for the run to produce S701H-01 and S701H-02

| y | S010-G16-09A |
|---|---|
| a | 22.68 |
| b | 300 |

TABLE 63-continued

Parameters for the run to produce S701H-01 and S701H-02

| y | S010-G16-09A |
|---|---|
| c | 280 |
| d | 1.60 |
| e | 1 |
| f | 2.98 |
| g | 560 |
| h | 76 |
| i | PES |
| j | 100,000 |
| k | 50 |
| l | 4.51 |
| m | 100 |
| n | 50 |
| o | 38 |
| p | 300 |
| q | 50 |
| r | 7.97 |
| s | 16 |
| t | 6.94 |
| u | 77.7 |
| v | 102.17 |
| w | 0.02 |
| x | 15.1 |
| z | 17.57 |
| aa | 102.61 |
| ab | 0.00 |
| ac | 6.8 |

As may be seen from the results of Table 63, addition of sodium sulfite to the acidified, diafiltered concentrated protein solution prior to drying reduced the trypsin inhibitor activity of the isolate.

When the S701H isolate samples were dissolved in water, the resulting low pH solutions were transparent and very light in colour as may be seen from the results set forth in the following Table 63A.

TABLE 63A pH, colour and haze readings for solutions of S701H in water

| Sample | pH | L* | a* | b* | haze (%) |
|---|---|---|---|---|---|
| S010-G16-09A S701H-01 | 3.38 | 96.13 | −0.29 | 6.71 | 7.1 |
| S010-G16-09A S701H-02 | 3.38 | 96.21 | −0.29 | 6.68 | 6.2 |

Example 38

This Example illustrates the effect of pH of membrane processing on the trypsin inhibitor activity of the novel, acid soluble soy protein isolate (S701) provided herein.

'a' kg of defatted, soy white flake was added to 'b' L of 0.15 M CaCl$_2$ solution at ambient temperature and agitated for 30 minutes. The residual soy flake was removed and the resulting protein solution was clarified by centrifugation and filtration to produce 'c' L of filtered protein solution having a protein content of 'd' % by weight.

The filtered protein solution was then added to 'e' volume(s) of reverse osmosis (RO) purified water and the pH of the sample lowered to 'f' with diluted HCl. The diluted and acidified solution was not heat treated.

The diluted and acidified protein extract solution was reduced in volume from 'g' L to 'h' L by concentration on a 'i' membrane, having a molecular weight cutoff of 'j' Daltons, operated at a temperature of approximately 'k' ° C. At this point the acidified protein solution, with protein content 'l' wt % was diafiltered with 'm' L of 'n' RO water, with the diafiltration operation conducted at approximately 'o' ° C. The diafiltered solution was then further concentrated to a volume of 'p' L and diafiltered with an additional 'q' L of 'r' RO water, with the diafiltration operation conducted at approximately 's' ° C. The diafiltered protein solution had a protein content of 't' % by weight and was recovered in a yield of 'u' wt % of the initial filtered protein solution. The acidified, diafiltered, concentrated protein solution was then 'v' and dried to yield a product found to have a protein content of 'w' wt % (N×6.25) d.b. and a phytic acid content of 'x' wt % d.b. The dry product was found to have a trypsin inhibitor activity of 'y' trypsin inhibitor units (TIU)/mg protein (N×6.25). The product was given designation 'z' S701.

The parameters 'a' to 'z' for two runs are set forth in the following Table 64:

TABLE 64

Parameters for the runs to produce S701

| z | S013-I15-09A | S013-I24-09A |
|---|---|---|
| a | 30 | 30 |
| b | 300 | 300 |
| c | 265 | 280 |
| d | 1.87 | 1.90 |
| e | 1 | 1 |
| f | 2.85 | 2.01 |
| g | 540 | 560 |
| h | 84 | 93 |
| i | PES | PES |
| j | 100,000 | 100,000 |
| k | 30 | 30 |
| l | 5.57 | 5.15 |
| m | 100 | 115 |
| n | natural pH | pH 2 |
| o | 30 | 29 |
| p | 42 | 47 |
| q | 300 | 345 |
| r | natural pH | pH 2 |
| s | 29 | 29 |
| t | 9.84 | 9.99 |
| u | 87.5 | 88.3 |
| v | — | adjusted to pH 3.00 with diluted NaOH |
| w | 100.46 | 98.97 |
| x | 0.13 | 0.41 |
| y | 70.0 | 55.7 |

As may be seen from the results of Table 64, the isolate prepared with membrane processing at approximately pH 2 had a lower trypsin inhibitor activity than the isolate prepared with membrane processing at approximately pH 3.

When the S701 isolate samples were dissolved in water, the resulting low pH solutions were transparent and very light in colour as may be seen from the results set forth in the following Table 64A.

TABLE 64A pH, colour and haze readings for solutions of S701 in water

| sample | pH | L* | a* | b* | haze (%) |
|---|---|---|---|---|---|
| S013-I15-09A S701 | 3.29 | 94.36 | −0.21 | 10.07 | 11.2 |
| S013-I24-09A S701 | 2.97 | 96.53 | −0.66 | 7.22 | 7.1 |

Example 39

This Example compares the solution colour values determined for products produced according to the present invention with the solution colour values of typical commercial soy protein products.

The solution colour values for solutions of products produced in the Examples herein in accordance with the present invention were determined using a HunterLab ColorQuest XE instrument operated in transmission mode and such data is set forth in Examples 4, 5, 6, 10, 11, 12, 27, 28, 29, 30, 31, 32, 33, 34, 35, 36, 37 and 38.

The solution colour values were also determined for a selection of commercial soy protein products and the results compared. As in the trials cited above, the protein solution was prepared by dissolving sufficient protein product to supply 0.48 g of protein in 15 ml of RO water. Since the samples provided in the Examples produced solutions having a natural pH of about 3, the tests were done both at the natural pH of the solution provided from the commercial samples and at an adjusted pH of 3. The results obtained are set forth in the following Tables 65 and 66.

TABLE 65

Colour values for solutions of commercial soy protein products in water at natural pH

| sample | pH | L* | a* | b* |
|---|---|---|---|---|
| Solae Supro XT-40 | 7.34 | 35.52 | 5.97 | 31.04 |
| Solae Supro XT-34N | 7.13 | 39.37 | 6.39 | 34.22 |
| Solae Supro 670 | 7.44 | 37.87 | 6.43 | 31.87 |
| ADM Pro Fam 825 | 7.13 | 43.03 | 5.72 | 32.00 |
| ADM Pro Fam 873 | 7.12 | 45.07 | 4.66 | 30.87 |
| ADM Pro Fam 781 | 7.09 | 42.48 | 4.72 | 29.38 |

TABLE 66

Colour values for 3.2% protein w/v solutions of commercial soy protein products in water at pH 3

| sample | L* | a* | b* |
|---|---|---|---|
| Solae Supro XT-40 | 36.65 | 4.62 | 27.24 |
| Solae Supro XT-34N | 46.56 | 3.95 | 30.08 |
| Solae Supro 670 | 36.44 | 6.67 | 31.71 |
| ADM Pro Fam 825 | 38.08 | 6.83 | 31.82 |
| ADM Pro Fam 873 | 44.73 | 4.47 | 29.67 |
| ADM Pro Fam 781 | 42.90 | 4.33 | 27.94 |

As may be seen from the data in Tables 65 and 66 and by comparison with the solution colour values provided in the Examples for products of the invention, the solution colour for the products of the invention was much lighter than for the commercial products, exhibiting notably lower a* (less red) and b* (less yellow) values. The aqueous solutions of the products provided herein exhibited a much higher L* value as a result of significantly lower haze in the solutions, when compared to solutions of the poorly soluble commercial products.

Example 40

This Example illustrates the solubility of the novel soy protein products at pH 7 to 8 as well as the clarity and heat stability of solutions produced at such pH values.

The solubility of batches S005-K18-08A S701 and S010-G14-09A S701H, prepared as described respectively in Examples 12 and 32, in water using the "protein method" described in Example 14, was determined at pH levels of 7, 7.5 and 8.

The solubilities of the products is shown in the following Table 67:

TABLE 67

Solubility of products at pH 7 to 8 based on protein method

| pH | S005-K18-08A S701 solubility (%) | S010-G14-09A S701H solubility (%) |
|---|---|---|
| 7 | 94.4 (see Example 14) | 100 |
| 7.5 | 100 | 92.5 |
| 8 | 97.6 | 100 |

As can be seen from the results in Table 67, the products were both highly soluble over the pH range of 7 to 8.

The clarity of these isolates was assessed using the method described in Example 15. The clarity readings for 1% protein w/v solutions are shown in the following Tables 68 and 69:

TABLE 68

A600 readings for solutions at pH 7 to 8

| pH | S005-K18-08A S701 A600 | S010-G14-09A S701H A600 |
|---|---|---|
| 7 | 0.225 (see Example 15) | 0.198 |
| 7.5 | 0.035 | 0.082 |
| 8 | 0.026 | 0.040 |

TABLE 69

HunterLab haze readings (%) for solutions at pH 7 to 8

| pH | S005-K18-08A S701 haze (%) | S010-G14-09A S701H haze (%) |
|---|---|---|
| 7 | not determined | 24.9 |
| 7.5 | 1.3 | 9.0 |
| 8 | 0.5 | 3.1 |

As can be seen from the results shown in Tables 68 and 69, the protein solutions were quite clear in the pH range 7.5 to 8.

The heat stability of the products was tested using the method described in Example 16, but with the pH of the protein solutions adjusted to 7, 7.5 or 8 prior to heat treatment. The results obtained are set forth in the following Tables 70 and 71:

TABLE 70

Effect of heat treatment on clarity of solutions of S005-K18-08A S701 at pH 7 to 8

| pH | % haze before heat treatment | % haze after heat treatment |
|---|---|---|
| 7 | 96.2 | 95.5 |
| 7.5 | 13 | 10.1 |
| 8 | 8.2 | 5.1 |

TABLE 71

Effect of heat treatment on clarity of solutions of S005-G14-09A S701H at pH 7 to 8

| pH | % haze before heat treatment | % haze after heat treatment |
|---|---|---|
| 7 | 95.6 | 13.5 |
| 7.5 | 95.9 | 10 |
| 8 | 74.1 | 9.6 |

Both samples appeared to be heat stable in the pH range 7 to 8. The S701H gave cloudy solutions at all pH values tested that cleared upon heating. The S701 gave a cloudy solution at pH 7 that had approximately the same level of haze after heating. The S701 gave clear solutions at pH 7.5 and 8 that remained clear after heat treatment.

As can be seen from the data presented in this Example, the S701 product was soluble at pH 7 to 8, transparent at pH 7.5 to 8 and heat stable at pH 7 to 8.

SUMMARY OF THE DISCLOSURE

In summary of this disclosure, the present invention provides a novel soy protein product, which may be in the form of an isolate, which is completely soluble and forms transparent heat stable solutions at acid pH and is useful in the protein fortification of aqueous systems, including soft drinks and sports drinks, without leading to protein precipitation. Modifications are possible within the scope of this invention.

What we claim is:

1. A process for the preparation of a soy protein product, which comprises:
    (a) extracting a soy protein source with an aqueous calcium salt solution to cause solubilization of soy protein from the soy protein source and to form an aqueous soy protein solution,
    (b) at least partially separating the aqueous soy protein solution from residual soy protein source,
    (c) adjusting the pH of the aqueous soy protein solution to a pH of about 1.5 to about 4.4 to produce an acidified soy protein solution, and
    (d) drying the acidified soy protein solution to provide the soy protein product having a protein content of at least about 60 wt % (N×6.25) d.b.

2. The process of claim 1 wherein said extraction step is effected using an aqueous calcium chloride solution having a concentration of less than about 1.0 M.

3. The process of claim 2 wherein said aqueous calcium chloride solution has a concentration of about 0.10 to about 0.15 M.

4. The process of claim 1 wherein said extraction step is effected at a temperature of about 15° to about 60° C.

5. The process of claim 1 wherein said extraction with aqueous calcium salt solution is conducted at a pH of about 5 to about 11.

6. The process of claim 5 wherein said pH is about 5 to about 7.

7. The process of claim 1 wherein said aqueous soy protein solution has a protein concentration of about 5 to about 50 g/L.

8. The process of claim 7 wherein said protein concentration is about 10 to about 50 g/L.

9. The process of claim 1 wherein said aqueous calcium salt solution contains an antioxidant.

10. The process of claim 1 wherein, following said separation step and prior to said pH adjustment step, said aqueous soy protein solution is treated with an adsorbent to remove colour and/or odour compounds from the aqueous soy protein solution.

11. The process of claim 1 wherein said acidified soy protein solution has a conductivity of less than about 95 mS.

12. The process of claim 11 wherein said conductivity is about 4 to about 23 mS.

13. The process of claim 1 wherein the pH of said aqueous soy protein solution is adjusted to about pH 2 to about 4.

14. The process of claim 1 wherein the pH-adjusted soy protein solution is subjected to a polishing step.

15. The process of claim 1, wherein said acidified aqueous protein solution is subjected to a heat treatment step to inactivate heat-labile anti-nutritional factors.

16. The process of claim 15 wherein the anti-nutritional factors are heat-labile trypsin inhibitors.

17. The process of claim 15 wherein the heat treatment step also pasteurizes the acidified aqueous protein solution.

18. The process of claim 15, wherein said heat treatment is effected at a temperature of about 70° to about 160° C. for about 10 seconds to about 60 minutes.

19. The process of claim 18 wherein said heat treatment is effected at a temperature of about 80° to about 120° C. for about 10 seconds to about 5 minutes.

20. The process of claim 19 wherein said heat treatment is effected at a temperature of about 85° C. to about 95° C. for about 30 seconds to about 5 minutes.

21. The process of claim 15 wherein the heat treated acidified soy protein solution is cooled to a temperature of about 2° to about 60° C. for further processing.

22. The process of claim 21 wherein the heat treated acidified soy protein solution is cooled to a temperature of about 20° to about 35° C. for further processing.

23. The process of claim 15 wherein the heat treated soy protein solution is subjected to a polishing step.

24. The process of claim 1 wherein a reducing agent is present during the extraction step to disrupt or rearrange the disulfide bonds of trypsin inhibitors to achieve a reduction in trypsin inhibitor activity.

25. The process of claim 4 wherein said extraction step is effected at a temperature of about 15° C. to about 35° C.

26. A process for the preparation of a soy protein product, which comprises:
    (a) extracting a soy protein source with an aqueous calcium salt solution to cause solubilization of soy protein from the soy protein source and to form an aqueous soy protein solution,
    (b) at least partially separating the aqueous soy protein solution from residual soy protein source,
    (c) diluting said aqueous soy protein solution to a conductivity of less than about 90 mS,
    (d) adjusting the pH of the diluted aqueous soy protein solution to a pH of about 1.5 to about 4.4 to produce an acidified soy protein solution, and
    (e) drying said acidified soy protein solution to provide soy protein product.

27. The process of claim 26 wherein said aqueous soy protein solution is diluted with about 0.5 to about 10 volumes of aqueous diluent to provide a conductivity of said soy protein solution of about 4 to about 18 mS.

28. The process of claim 26 wherein said aqueous diluent has a temperature of about 2° to about 70° C.

29. The process of claim 28 wherein said temperature is about 10° to about 50° C.

30. The process of claim 29 wherein said temperature is about 20° to about 30° C.

31. A process for the preparation of a soy protein product, which comprises:
    (a) extracting a soy protein source with an aqueous calcium salt solution to cause solubilization of soy protein from the soy protein source and to form an aqueous soy protein solution,
    (b) at least partially separating the aqueous soy protein solution from residual soy protein source,
    (c) adjusting the pH of the aqueous soy protein solution to a pH of about 1.5 to about 4.4 to produce an acidified soy protein solution, (d) concentrating said acidified clear soy protein solution while maintaining the ionic strength thereof substantially constant to produce a concentrated acidified clear soy protein solution having a protein concentration of about 50 to about 300 g/L and the concentrated acidified clear soy protein solution is optionally diafiltered, and (e) drying the concentrated and optionally diafiltered acidified clear soy protein solution to provide the soy protein product.

32. The process of claim 31 wherein said concentrated acidified clear soy protein solution has a protein concentration of about 100 to about 200 g/L.

33. The process of claim 31 wherein said concentration step is effected by ultrafiltration using a membrane having a molecular weight cut-off of about 3,000 to about 1,000,000 Daltons.

34. The process of claim 33 wherein said membrane has a molecular weight cut-off of about 5,000 to about 100,000 Daltons.

35. The process of claim 31 wherein a diafiltration step is effected using water, acidified water, dilute saline or acidified dilute saline on the acidified clear soy protein solution before or after partial or complete concentration thereof.

36. The process of claim 35 wherein said diafiltration is effected using about 2 to about 40 volumes of diafiltration solution.

37. The process of claim 36 wherein said diafiltration is effected using about 5 to about 25 volumes of diafiltration solution.

38. The process of claim 35 wherein said diafiltration is effected until no significant further quantities of contaminants or visible colour are present in the permeate.

39. The process of claim 35 wherein said diafiltration is effected until the retentate has been sufficiently purified so as, when dried, to provide a soy protein isolate with a protein content of at least about 90 wt % (N×6.25) d.b.

40. The process of claim 35 wherein said diafiltration is effected using a membrane having a molecular weight cut-off of about 3,000 to about 1,000,000 Daltons.

41. The process of claim 40 wherein said membrane has a molecular weight cut-off of about 5,000 to about 100,000 Daltons.

42. The process of claim 35 wherein an antioxidant is present in the diafiltration medium during at least part of the diafiltration step.

43. The process of claim 31 wherein said concentration step and optional diafiltration step are carried out at a temperature of about 2° to about 60° C.

44. The process of claim 43 wherein said temperature is about 20° to about 35° C.

45. The process of claim 31 wherein the partially concentrated or concentrated and optionally diafiltered acidified clear soy protein solution is subjected to a heat treatment step to inactivate heat-labile anti-nutritional factors, including heat-labile trypsin inhibitors.

46. The process of claim 45 wherein said heat treatment is effected at a temperature of about 70° to about 160° C. for about 10 seconds to about 60 minutes.

47. The process of claim 46 wherein the heat treated soy protein solution is cooled to a temperature of about 2° to about 60° C. for further processing.

48. The process of claim 31 wherein said concentrated and optionally diafiltered acidified clear soy protein solution is treated with an adsorbent to remove colour and/or odour compounds.

49. The process of claim 31 wherein said concentrated and optionally diafiltered acidified clear soy protein solution is pasteurized prior to drying.

50. The process of claim 49 wherein said pasteurization step is effected at a temperature of about 55° to about 70° C. for about 30 seconds to about 60 minutes.

51. The process of claim 50 wherein said pasteurization step is effected at a temperature of about 60° to about 65° C. for about 10 to about 15 minutes.

52. The process of claim 39 wherein said concentrated and diafiltered acidified clear soy protein solution is dried to provide a soy protein isolate having a protein content of at least about 90 wt % (N×6.25) d.b.

53. The process of claim 52 wherein said soy protein isolate has a protein content of at least about 100 wt % (N×6.25) d.b.

54. The process of claim 31 wherein the concentration and/or optional diafiltration step are operated in a manner favourable to the removal of trypsin inhibitors.

55. The process of claim 31 wherein a reducing agent is present during the concentration and/or optional diafiltration step to disrupt or rearrange the disulfide bonds of trypsin inhibitors to achieve a reduction in trypsin inhibitor activity.

56. The process of claim 46 wherein said heat treatment is effected at a temperature of about 80° C. to about 120° C. for about 10 seconds to about 5 minutes.

57. The process of claim 56 wherein said heat treatment is effected at a temperature of about 85° C. to about 95° C. for about 30 seconds to about 5 minutes.

58. The process of claim 47 wherein the heat treated soy protein solution is cooled to a temperature of about 20° C. to about 35° C. for further processing.

59. A process for the preparation of a soy protein product having a protein content of at least about 60 wt % (N×6.25) d.b., which comprises:
(a) extracting a soy protein source with an aqueous calcium salt solution to cause solubilization of soy protein from the soy protein source and to form an aqueous soy protein solution,
(b) at least partially separating the aqueous soy protein solution from residual soy protein source,
(c) adjusting the pH of the aqueous soy protein solution to a pH of about 1.5 to about 4.4 to produce an acidified soy protein solution,
(d) concentrating and optionally diafiltering said acidified clear soy protein solution while maintaining the ionic strength thereof substantially constant to produce a concentrated and optionally diafiltered acidified clear soy protein solution which, when dried, provides a soy protein product having a protein concentration of at least about 60 wt % (N×6.25) d.b., and
(e) drying and concentrated acidified clear soy protein solution to provide said soy protein product.

60. The process of claim 59 wherein a reducing agent is added to the concentrated and optionally diafiltered soy protein solution prior to drying and/or the dried soy protein product to disrupt or rearrange the disulfide bonds of trypsin inhibitors to achieve a reduction in trypsin inhibitor activity.

61. A process for the preparation of a soy protein product having a protein content of at least about 60 wt % (N×6.25) d.b., which comprises:
(a) extracting a soy protein source with an aqueous calcium chloride solution having a concentration of less than about 1.0 M and a pH of about 5 to about 11 at a temperature of about 15° C. to about 60° C. to form an aqueous soy protein solution having a protein concentration of about 5 to about 50 g/L, (b) at least partially separating the aqueous soy protein solution from residual soy protein source,
(c) diluting said aqueous soy protein solution to a conductivity of less than about 90 mS to provide a diluted aqueous soy protein solution,
(d) adjusting the pH of the diluted aqueous soy protein solution to a pH of about 1.5 to about 4.4 to provide a acidified soy protein solution,
(e) concentrating the acidified aqueous soy protein solution while maintaining the ionic strength thereof substantially constant to produce a concentrated acidified clear soy protein solution having a protein concentration of about 50 to about 300 g/L,
(f) optionally diafiltering the concentrated acidified clear soy protein solution, wherein said concentration step and optional diafiltration are effected to provide a concentrated and optionally diafiltered acidified clear soy protein solution which, when dried provide a soy protein product having a protein concentration of at least about 60 wt % (N×6.25) d.b., and
(g) drying the concentrated and optionally diafiltered acidified clear soy protein solution to provide the soy protein product.

\* \* \* \* \*